United States Patent
Kim et al.

(10) Patent No.: US 9,712,791 B2
(45) Date of Patent: Jul. 18, 2017

(54) AROUND VIEW PROVISION APPARATUS AND VEHICLE INCLUDING THE SAME

(71) Applicant: LG ELECTRONICS INC., Seoul (KR)

(72) Inventors: Younsun Kim, Seoul (KR); Chaehwan Leem, Seoul (KR); Jonghun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 14/671,333

(22) Filed: Mar. 27, 2015

(65) Prior Publication Data

US 2015/0350607 A1 Dec. 3, 2015

(30) Foreign Application Priority Data

May 30, 2014 (KR) .................. 10-2014-0066490

(51) Int. Cl.
*H04N 7/18* (2006.01)
*B60R 1/00* (2006.01)

(52) U.S. Cl.
CPC .............. *H04N 7/181* (2013.01); *B60R 1/00* (2013.01); *B60R 2300/101* (2013.01); *B60R 2300/802* (2013.01); *B60R 2300/8026* (2013.01)

(58) Field of Classification Search
CPC ....................................... H04N 7/181
USPC ........................................... 348/148
See application file for complete search history.

(56) References Cited

U.S. PATENT DOCUMENTS

| 7,688,221 B2* | 3/2010 | Watanabe ................ B60R 1/00 180/167 |
| 2005/0030380 A1* | 2/2005 | Oizumi .................... B60R 1/00 348/148 |
| 2008/0055411 A1* | 3/2008 | Lee .......................... B60R 1/00 348/148 |

(Continued)

FOREIGN PATENT DOCUMENTS

| CN | 1924514 | 3/2007 |
| CN | 102632839 | 8/2012 |

(Continued)

OTHER PUBLICATIONS

Korean Office Action issued in related Application No. 10-2014-0066490 dated Apr. 9, 2015.

(Continued)

*Primary Examiner* — Dominic D Saltarelli
(74) *Attorney, Agent, or Firm* — Ked & Associates, LLP

(57) ABSTRACT

An around view provision apparatus and a vehicle including the same may include at least one camera mounted on a vehicle, a direction of the at least one camera being adjustable, and a processor to control the at least one camera to capture images around the vehicle based on a movement of the vehicle. The camera may be controlled to operate in a first mode when the vehicle is moving forward at a first prescribed speed or more and in a second mode when the vehicle is moving forward at less than a second prescribed speed or is moving backward. In the first mode, the camera may capture a lateral region that cannot be observed through a side view mirror or a rear view mirror. In the second mode, the camera may capture a larger region that is angled downward relative to the lateral region in the first mode.

18 Claims, 27 Drawing Sheets

(56) References Cited

U.S. PATENT DOCUMENTS

2009/0079828 A1* 3/2009 Lee .......................... B60R 1/00
348/148

FOREIGN PATENT DOCUMENTS

| | | |
|---|---|---|
| EP | 1 227 683 A1 | 7/2012 |
| JP | 2007-064804 | 3/2007 |
| KR | 10-2004-0033675 | 4/2004 |
| KR | 10-2007-0047944 | 5/2007 |
| KR | 10-2011-0087736 | 8/2011 |
| KR | 10-1255945 B1 | 4/2013 |
| KR | 10-2013-0112424 | 10/2013 |
| WO | WO 96/38319 A2 | 12/1996 |

OTHER PUBLICATIONS

European Search Report dated Nov. 2, 2015 issued in Application No. 15001624.4.
Chinese Office Action Mar. 3, 2017 issued in Application N 201510279191.4 (with English translation).

* cited by examiner (a)  (b)

(a)  (b)

(a)  (b)

AROUND VIEW PROVISION APPARATUS AND VEHICLE INCLUDING THE SAME

CROSS-REFERENCE TO RELATED APPLICATION

This application claims priority under 35 U.S.C. §119 to Korean Patent Application No. 10-2014-0066490, filed on May 30, 2014, whose entire disclosure is hereby incorporated by reference.

BACKGROUND

1. Field

The present disclosure relates to an around view provision apparatus and a vehicle including the same and, more particularly, to an around view provision apparatus that is capable of photographing a region that cannot be observed by the naked eye or using the side view and rear view mirrors, or providing an around view image using a direction-adjustable camera and a vehicle including the same.

2. Background

Around view provision apparatuses and vehicles including the same are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Exemplary embodiments of the present disclosure will be described with reference to the attached drawings.

The terms "module" and "unit," when attached to the names of components are used herein to help the understanding of the components and thus they should not be considered as having specific meanings or roles. Accordingly, the terms "module" and "unit" may be used interchangeably.

Broadly, a vehicle is a device that allows a driver to move in a desired direction. A representative example of the vehicle may be a car. In order to improve convenience of a user who uses the vehicle, the vehicle may be equipped with various sensors and electronic devices. In particular, various devices to improve driving convenience of the user have been developed. For example, a rear view camera may be provided to display a rear view image when moving the vehicle backward or when parking the vehicle.

It is an object of the present disclosure to provide an around view provision apparatus that is capable of capturing a region that cannot be observed by the naked eye or using the side or rear mirrors, or providing an around view image using a direction-adjustable camera and a vehicle including the same. In one embodiment, blind spot monitoring (BSM) may be implemented in an around view monitoring (AVM) apparatus.

A vehicle as described in this specification may include a car, a truck, a motorcycle, or another appropriate type of vehicle. Hereinafter, a description will be given based on a car merely for sake of convenience. It should be appreciated, however, that a vehicle as described in this disclosure may include various types of transportation devices, including but not limited to, a vehicle having an engine as a power source, a hybrid vehicle having an engine and an electric motor as a power source, an electric vehicle having an electric motor as a power source, or the like.

Meanwhile, an around view provision apparatus as described in this specification may be an apparatus that includes a plurality of cameras and which may combine a plurality of images captured by the cameras to generate an around view image. In particular, the around view provision apparatus may be a vehicle-based apparatus that provides a top view or a bird eye view. Moreover, the cameras may include picture cameras and video cameras, and the captured image may include pictures photographed by the cameras or video images recorded using the cameras. Hereinafter, a description will be given of various embodiments of an around view provision apparatus according to the present disclosure and a vehicle including the same.

Figure 1:
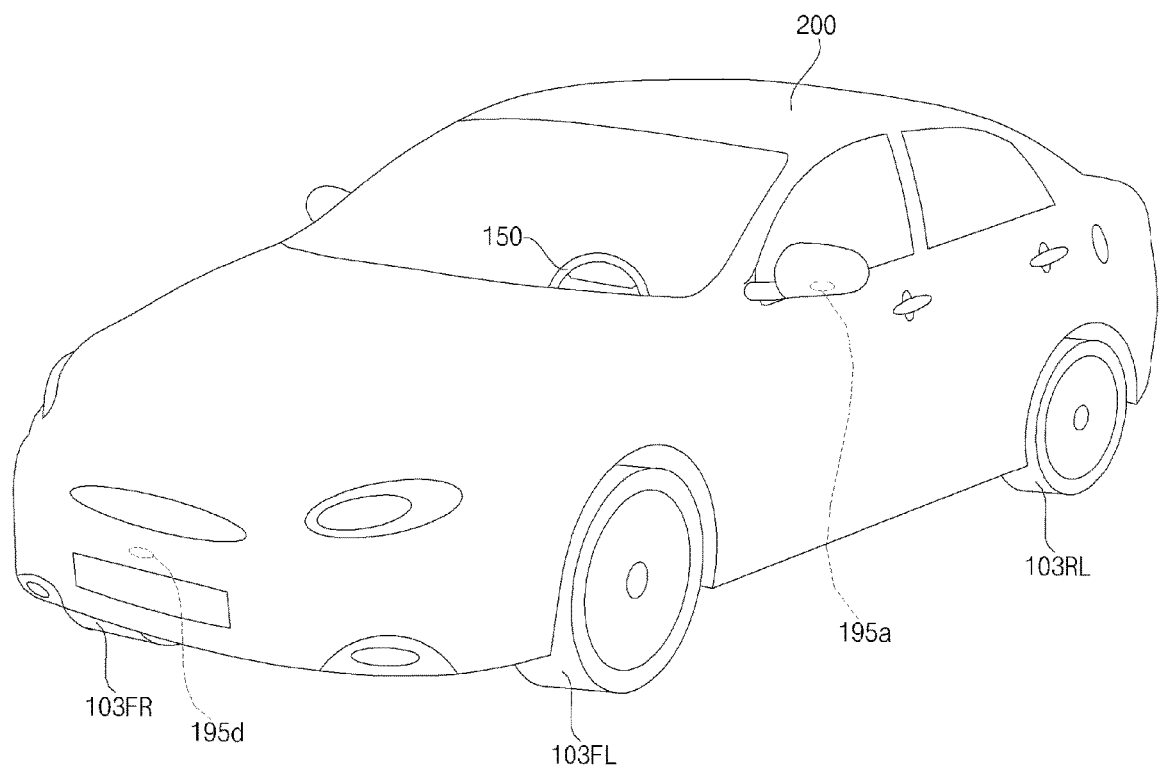
FIG. 1 is a view showing the external appearance of a vehicle having around view cameras according to an embodiment of the present disclosure.

FIG. 1 is a view showing the external appearance of a vehicle having around view cameras according to an embodiment of the present disclosure. A vehicle 200 may include a wheels 103FR, 103FL, 103RL, etc., a steering wheel 150, and a plurality of around view cameras 195a, 195b, 195c, and 195d mounted on the vehicle 200. In FIG. 1, only a left side view camera 195a and a front view camera 195d are shown merely for the sake of convenience.

When the vehicle moves forward at a predetermined speed or less or when the vehicle moves backward, the around view cameras 195a, 195b, 195c, and 195d may be activated to acquire images. The images acquired by the cameras may be signal-processed by an around view provision apparatus 100 (see FIG. 3A or 3B).

Figure 2A:
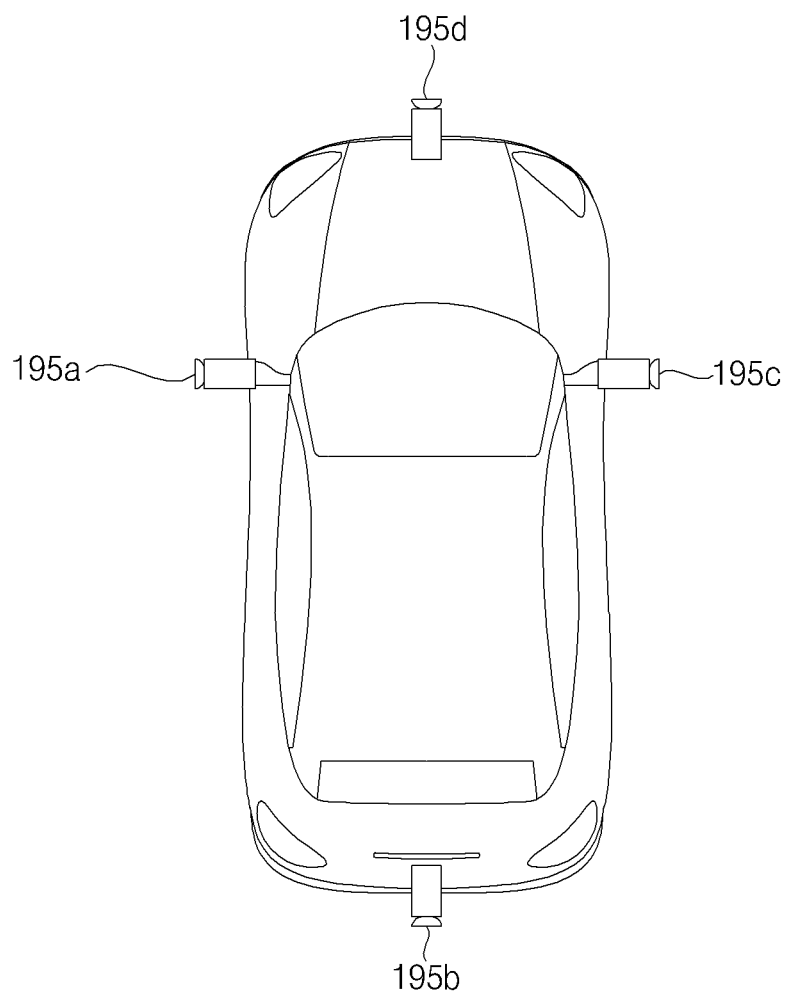
FIG. 2A is a view schematically showing positions of the around view cameras attached to the vehicle shown in FIG. 1.
Figure 2B:
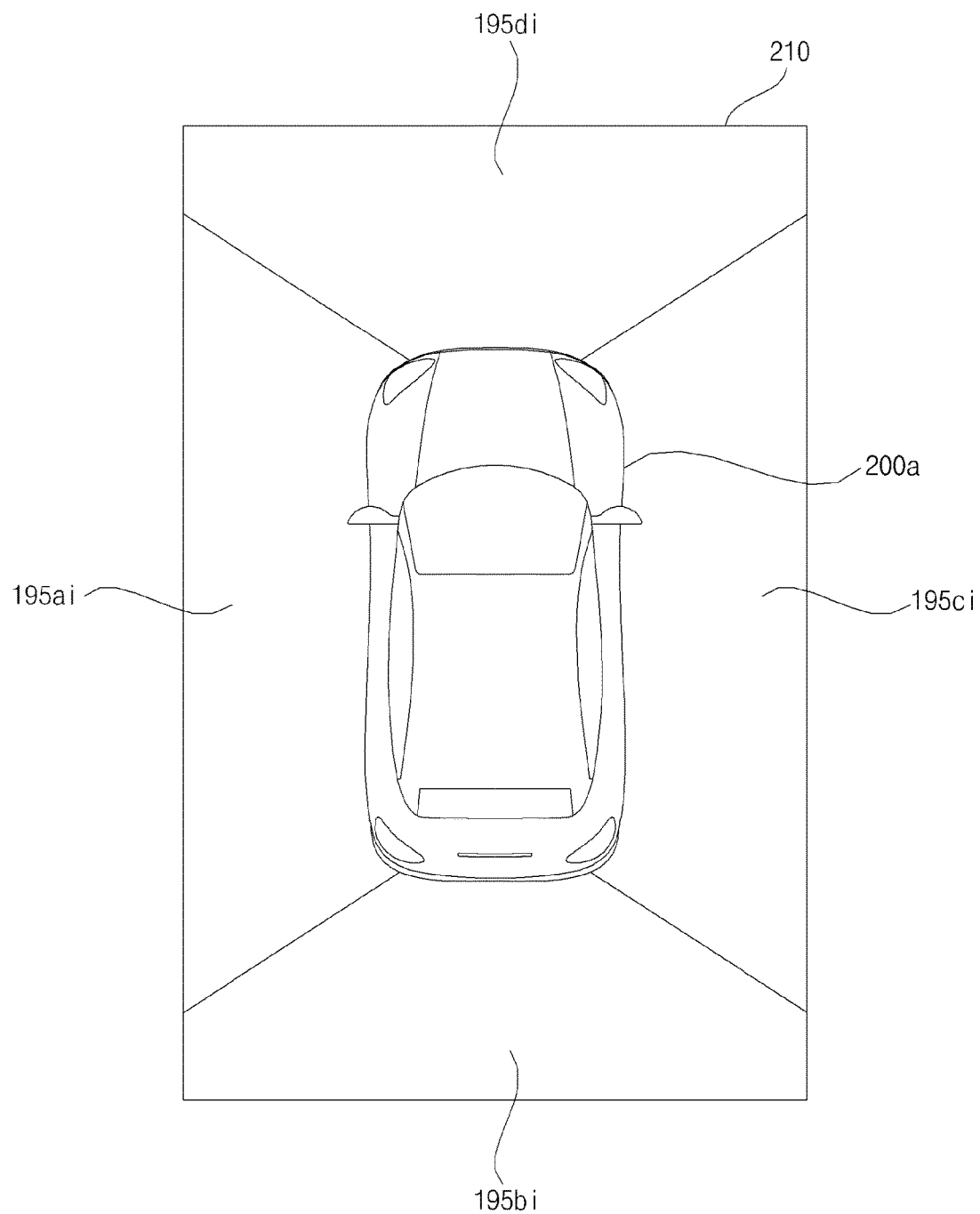
FIG. 2B is a view showing an around view image based on images photographed by the around view cameras of FIG. 2A.

FIG. 2A is a view schematically showing positions of the around view cameras attached to the vehicle shown in FIG. 1 and FIG. 2B is a view illustrating an around view image based on images captured by the around view cameras of FIG. 2A.

Referring first to FIG. 2A, the around view cameras 195a, 195b, 195c, and 195d may be disposed at the left side, the rear, the right side, and the front of the vehicle, respectively. In particular, the left side view camera 195a and the right side view camera 195c may be disposed in a case (or casing, housing, cover, etc.) surrounding a left side view mirror and a case surrounding a right side view mirror, respectively. On the other hand, the rear view camera 195b and the front view camera 195*d* may be disposed around a trunk switch and at an emblem or around the emblem, respectively.

A plurality of images photographed by the around view cameras 195*a*, 195*b*, 195*c*, and 195*d* may be transmitted to a processor 170 (see FIG. 3A or 3B) in the vehicle 200. The processor 170 (see FIG. 3A or 3B) may combine the images to generate an around view image.

FIG. 2B shows an example of an around view image 210. The around view image 210 may include a first image region 195*ai* from the left side view camera 195*a*, a second image region 195*bi* from the rear view camera 195*b*, a third image region 195*ci* from the right side view camera 195*c*, and a fourth image region 195*di* from the front view camera 195*d*.

Figure 3A:
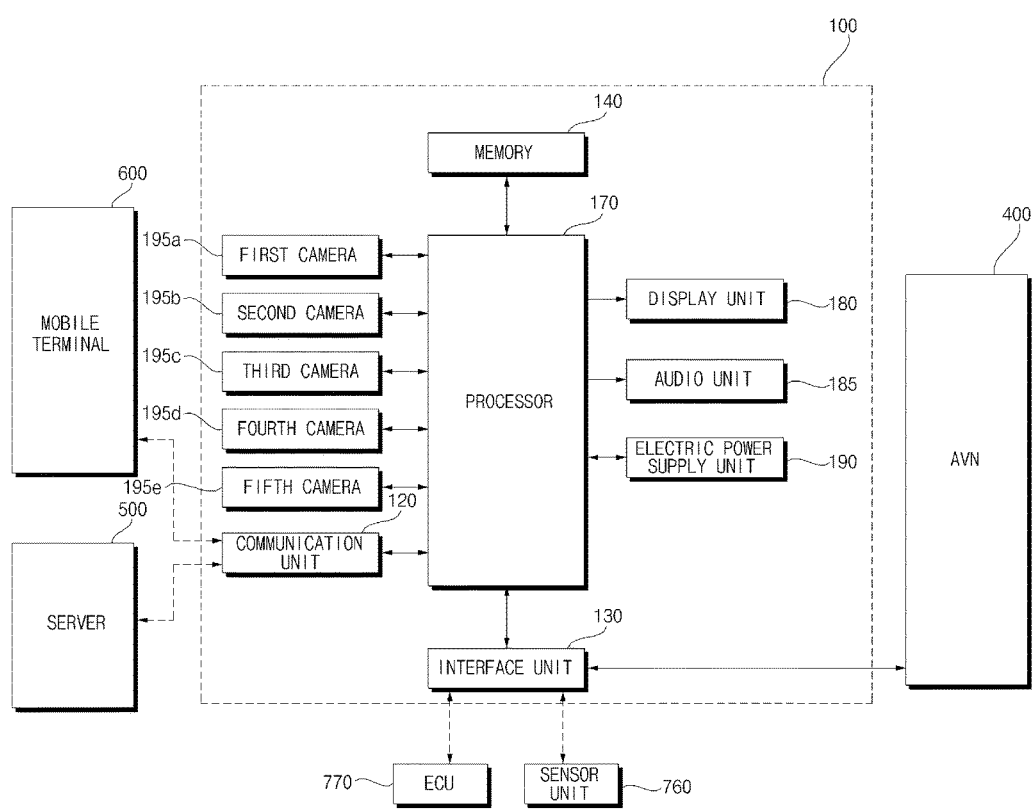
FIGS. 3A and 3B are internal block diagrams showing various examples of an around view provision apparatus according to an embodiment of the present disclosure.
Figure 3B:
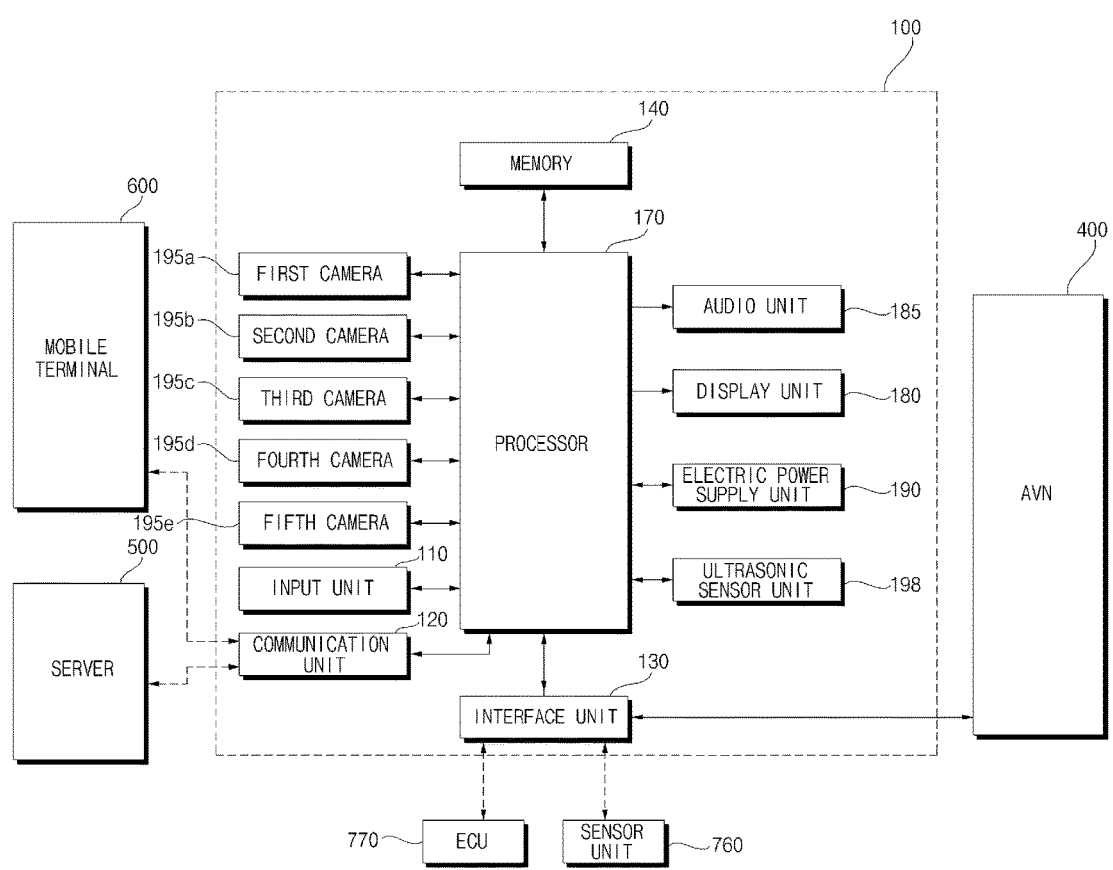

FIGS. 3A and 3B are internal block diagrams showing various examples of an around view provision apparatus according to an embodiment of the present disclosure. An around view provision apparatus 100 shown in FIGS. 3A and 3B may combine a plurality of images photographed by a plurality of cameras 195*a*, 195*b*, 195*c*, and 195*d* to generate an around view image. On the other hand, the around view provision apparatus 100 may also detect, verify, track and display an object around the vehicle based on a plurality of images photographed by the cameras 195*a*, 195*b*, 195*c*, and 195*d*.

Referring first to FIG. 3A, the around view provision apparatus 100 may include a communication unit 120, an interface unit 130, a memory 140, a processor 170, a display unit 180, an audio interface unit 185, an electric power supply unit 190, and a plurality of around view cameras 195*a*, 195*b*, 195*c*, 195*d*, and 195*e*. The audio interface unit 185 may include an audio input and/or an audio output devices.

The communication unit 120 may exchange data with a mobile terminal 600 or a server 500 in a wireless fashion. In particular, the communication unit 120 may exchange data with a mobile terminal of the driver in a wireless fashion. To this end, various wireless data communication protocols, such as Bluetooth, Wi-Fi, Wi-Fi Direct, and APiX, may be used.

The communication unit 120 may receive weather information and road traffic state information, such as Transport Protocol Expert Group (TPEG) information, from the mobile terminal 600 or the server 500. On the other hand, the communication unit 120 may transmit real-time traffic information acquired by the around view provision apparatus 100 based on images to the mobile terminal 600 or the server 500. When a user gets into the vehicle, a mobile terminal 600 of the user may pair with the around view provision apparatus 100 automatically or by the user executing an application.

The interface unit 130 may receive vehicle-related data or transmit a signal processed or generated by the processor 170 to the outside. To this end, the interface unit 130 may perform data communication with an electronic control unit (ECU) 770, an audio and video navigation (AVN) apparatus 400, and a sensor unit 760 in the vehicle in a wired communication fashion or a wireless communication fashion.

The interface unit 130 may receive map information related to vehicle travel through data communication with the AVN apparatus 400. On the other hand, the interface unit 130 may receive sensor information from the ECU 770 and the sensor unit 760.

The sensor information may include at least one selected from among vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information.

Of the above-specified sensor information, the vehicle heading information, the vehicle position information, the vehicle angle information, the vehicle speed information, and the vehicle tilt information, which are related to vehicle travel, may be referred to as vehicle travel information.

The memory 140 may store various data for overall operation of the around view provision apparatus 100, such as programs for processing or control of the processor 170.

The audio interface unit 185 may convert an electric signal received from the processor 170 into an audio signal and outputs the audio signal. To this end, the audio interface unit 185 may include a speaker. The audio interface unit 185 may output a sound corresponding to an operation of an input unit (not shown), e.g. a button. The audio input unit may detect a user's voice. To this end, the audio input unit may include a microphone. The received voice may be converted into an electric signal, which may be transmitted to the processor 170.

The processor 170 may control overall operation of each unit in the around view provision apparatus 100. In particular, the processor 170 may acquire a plurality of images from the cameras 195*a*, 195*b*, 195*c*, and 195*d* and combine the acquired images to generate an around view image.

On the other hand, the processor 170 may perform signal processing based on computer vision. For example, the processor 170 may calculate disparity for a view around the vehicle based on the acquired images or the generated around view image, detect an object in the image based on calculated disparity information, and continuously track motion of the object after detection of the object.

In particular, during detection of the object, the processor 170 may perform lane detection, adjacent vehicle detection, pedestrian detection, and road surface detection. In addition, the processor 170 may calculate the distance to the detected adjacent vehicle or the detected pedestrian.

On the other hand, the processor 170 may receive sensor information from the ECU 770 or the sensor unit 760 through the interface unit 130. The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

The display unit 180 may display the around view image generated by the processor 170. During display of the around view image, the display unit 180 may provide various user interfaces. In addition, the display unit 180 may include a touch sensor to sense a touch input to each user interface.

Meanwhile, the display unit 180 may include a cluster or a head up display (HUD) provided at the inside front of the vehicle. In a case in which the display unit 180 is the HUD, the display unit 180 may include a projection module to project an image on the front windshield glass of the vehicle 200.

The electric power supply unit 190 may supply electric power to the respective components under control of the processor 170. In particular, electric power from an in-vehicle battery may be supplied to the electric power supply unit 190.

The cameras 195a, 195b, 195c, and 195d may be cameras to provide an around view image. The cameras 195a, 195b, 195c, and 195d may be wide-angle cameras. The around view provision apparatus may include additional cameras. For example, a camera 195e may be an indoor camera mounted in the vehicle to photograph a user, specifically a driver. The processor 170 may detect the position of the driver based on an image from the indoor camera, set a region that cannot be observed by a side view mirror or a rear view mirror based on the position of the driver (e.g., blind spot), and control at least one of the cameras to be operated in a first mode, which is referred to as a blind spot detection (BSD) mode, in which at least one of the cameras is moved (e.g., tilted or rotated) to photograph the region that cannot be observed by the side view mirror or the rear view mirror.

Referring now to FIG. 3B, the around view provision apparatus 100 of FIG. 3B is similar to the around view provision apparatus 100 of FIG. 3A except that the around view provision apparatus 100 of FIG. 3B further includes an input unit 110 and a sensor unit 198. In a non-limiting example, the sensor unit 198 may include ultrasonic-sensors, and the sensor unit 198 may be referred to as an ultrasonic sensor unit 198. Hereinafter, for sake of brevity, a description will be given of only the input unit 110 and the ultrasonic sensor unit 198.

The input unit 110 may include a plurality of buttons attached around the display unit 180 or a touchscreen disposed on the display unit 180. The around view provision apparatus 100 may be powered on through the buttons or the touchscreen such that the around view provision apparatus 100 can be operated. On the other hand, various input operations may be performed through the input unit 110.

The ultrasonic sensor unit 198 may include a plurality of ultrasonic sensors. In a case in which the ultrasonic sensors are mounted in the vehicle, the ultrasonic sensor unit 198 may sense an object around the vehicle based on a difference between transmitted ultrasonic waves and received ultrasonic waves.

Unlike FIG. 3B, on the other hand, Light Detection And Ranging (LiDAR) may be provided instead of the ultrasonic sensor unit 198. Alternatively, both the ultrasonic sensor unit 198 and the LiDAR may be provided.

Figure 4A:
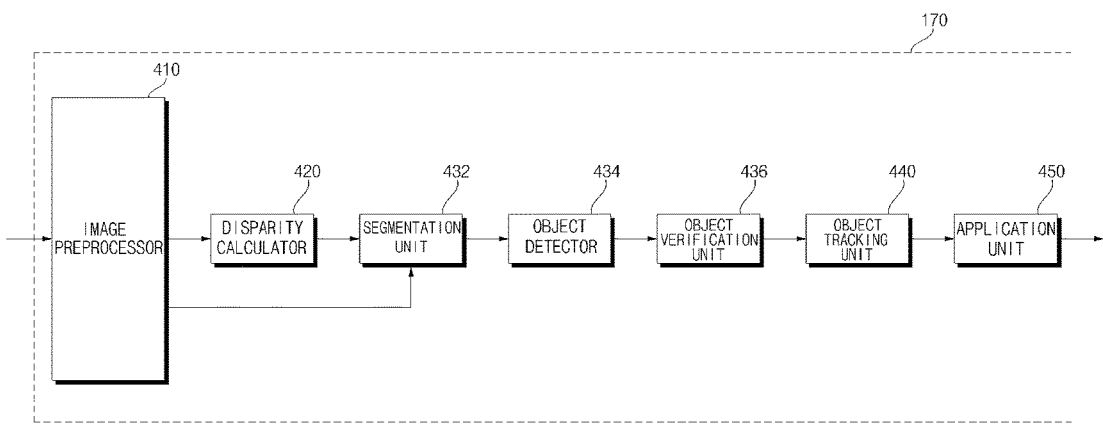
FIGS. 4A and 4B are internal block diagrams showing various examples of a processor shown in FIG. 3.
Figure 4B:
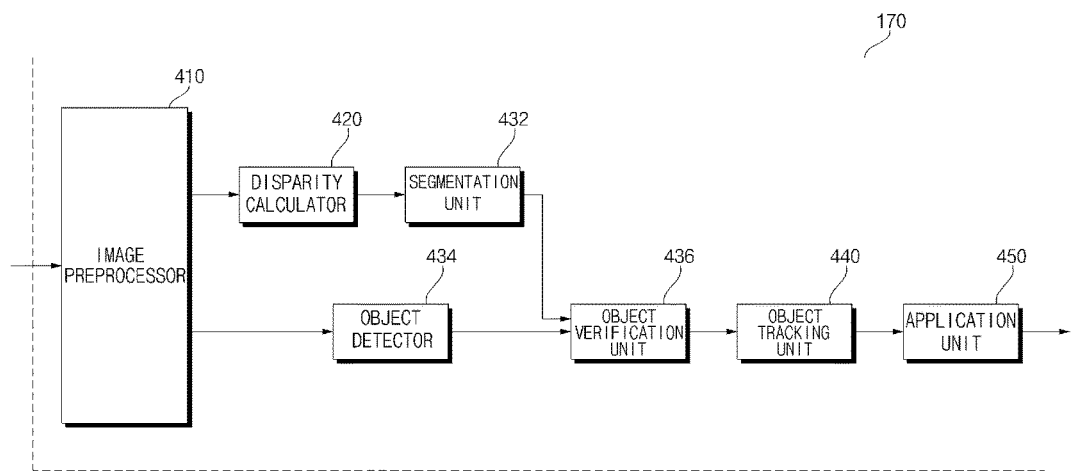
Figure 5:
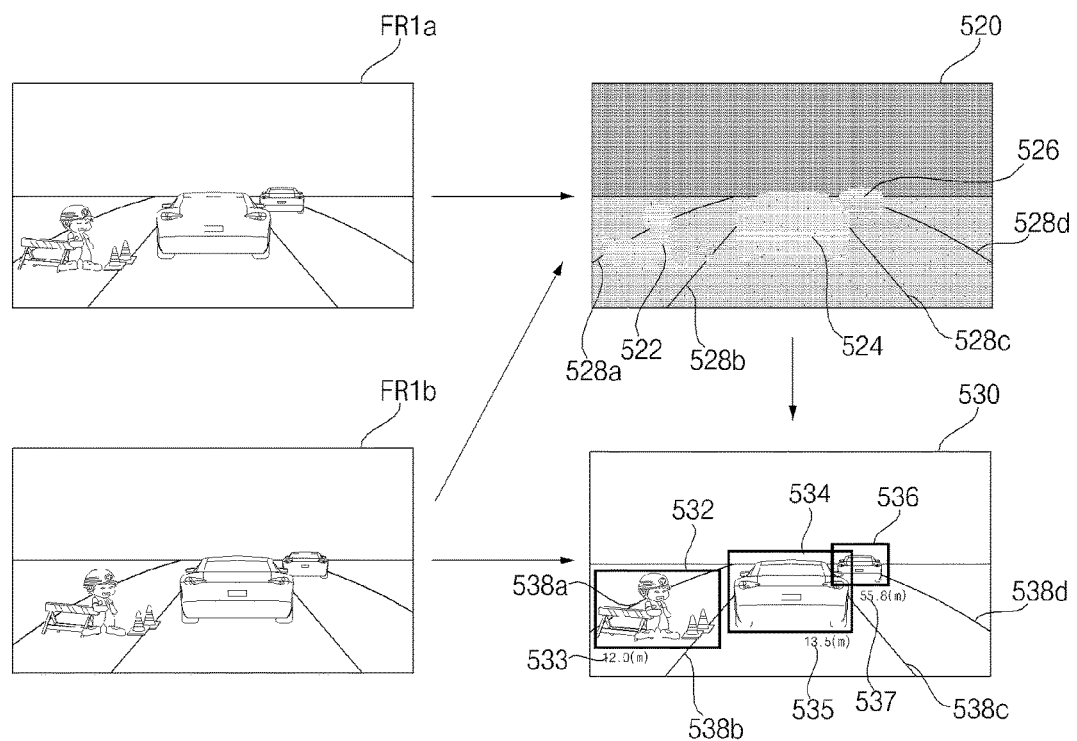
FIG. 5 is a series of views showing object detection performed by the processor of FIGS. 4A and 4B.

FIGS. 4A and 4B are internal block diagrams showing various examples of the processor shown in FIG. 3 and FIG. 5 is a series of views showing object detection performed by the processor of FIGS. 4A and 4B.

Referring first to FIG. 4A, which is an internal block diagram showing an example of the processor 170, the processor 170 of the around view provision apparatus 100 may include an image preprocessor 410, a disparity calculator 420, a segmentation unit 432, an object detector 434, an object verification unit 436, an object tracking unit 440, and an application unit 450.

The image preprocessor 410 may receive a plurality of images from the cameras 195a, 195b, 195c, and 195d or a generated around view image and may preprocess the plurality of images or the generated around view image. Specifically, the image preprocessor 410 may perform noise reduction, rectification, calibration, color enhancement, color space conversion (CSC), interpolation, camera gain control, or the like, for the plurality of images or the generated around view image. As a result, the image preprocessor 410 may acquire an image that is more vivid than the plurality of images from the cameras 195a, 195b, 195c, and 195d or the generated around view image.

The disparity calculator 420 may receive the plurality of images or the generated around view image signal-processed by the image preprocessor 410, sequentially perform stereo matching for the received plural images or the received around view image for a predetermined time, and acquire a disparity map based on the stereo matching. That is, the disparity calculator 420 may acquire disparity information for a view around the vehicle. The stereo matching may be performed on a per pixel basis or a per predetermined block basis of the images. Meanwhile, the disparity information may be included in a map showing binocular parallax information as values.

The segmentation unit 432 may perform segmentation and clustering in the images based on the disparity information from the disparity calculator 420. Specifically, the segmentation unit 432 may segment at least one of the images into a background and a foreground based on the disparity information.

For example, a region having a predetermined value or less of the disparity information in the disparity map may be calculated as a background and the region may be excluded. As a result, a foreground may be relatively separated from the image. In another example, a region having a predetermined value or more of the disparity information in the disparity map may be calculated as a foreground and the region may be extracted. As a result, the foreground may be separated from the image.

As described above, the image may be segmented into the background and the foreground based on the disparity information extracted based on the image. Therefore, signal processing speed and signal processing amount may be reduced during detection of an object.

The object detector 434 may detect an object based on the image segment from the segmentation unit 432. That is, the object detector 434 may detect an object for at least one of the images based on the disparity information. For example, the object detector 434 may detect an object from a foreground separated from the image by the image segment.

Subsequently, the object verification unit 436 may classify and verify the separated object. To this end, the object verification unit 436 may use a recognition method using a neural network, a support vector machine (SVM) method, a recognition method based on AdaBoost using a Haar-like feature, a histograms of oriented gradients (HOG) method, or another appropriate technique.

On the other hand, the object verification unit 436 may compare the detected object with objects stored in the memory 140 to verify the detected object. For example, the object verification unit 436 may verify an adjacent vehicle, a lane, a road surface, a traffic sign, a dangerous zone, a tunnel, etc. located around the vehicle.

The object tracking unit 440 may track the verified object. For example, the object tracking unit 440 may verify an object in images which are sequentially acquired, calculate motion or a motion vector of the verified object, and track movement of the object based on the calculated motion or the calculated motion vector. Consequently, the object tracking unit 440 may track an adjacent vehicle, a lane, a road surface, a traffic sign, a dangerous zone, etc. located around the vehicle.

FIG. 4B is an internal block diagram showing another example of the processor 170. The processor 170 of FIG. 4B is substantially the same as the processor 170 of FIG. 4A except that a signal processing sequence of the processor 170 of FIG. 4B is different from that of the processor 170 of FIG. 4A. Hereinafter, a description will be given of only the difference between the processor 170 of FIG. 4B and the processor 170 of FIG. 4A.

The object detector 434 may receive a plurality of images or a generated around view image and detect an object in the plurality of images or the generated around view image. Unlike FIG. 4A, the object detector 434 may not detect an object for an image segmented based on disparity information, but may directly detect an object from the plurality of images or the generated around view image.

Subsequently, the object verification unit 436 may classify and verify the detected and separated object based on the image segment from the segmentation unit 432 and the object detected by the object detector 434. To this end, the object verification unit 436 may use a recognition method using a neural network, an SVM method, a recognition method based on AdaBoost using a Haar-like feature, a HOG method, or the like.

FIG. 5 is a series of reference views illustrating an operation of the processor 170 shown in FIG. 4A or 4B based on images acquired from first and second frame periods. The cameras 195a, 195b, 195c, and 195d may sequentially acquire images FR1a and FR1b during the first and second frame periods.

The disparity calculator 420 of the processor 170 may receive the images FR1a and FR1b signal-processed by the image preprocessor 410 and may perform stereo matching for the received images FR1a and FR1b to acquire a disparity map 520. The disparity map 520 shows a disparity between the images FR1a and FR1b as levels. When a disparity level is high, the distance to the vehicle may be calculated as being short. When a disparity level is low, on the other hand, the distance to the vehicle may be calculated as being long.

Meanwhile, in a case in which the disparity map is displayed, the disparity map may be displayed with higher brightness when the disparity level is higher and the disparity map may be displayed with lower brightness when the disparity level is lower.

By way of example, FIG. 5 shows that in the disparity map 520 first to fourth lanes 528a, 528b, 528c, and 528d have their own disparity levels and a construction zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the images FR1a or FR1b based on the disparity map 520. Moreover, object detection and object verification for the second image FR1b may be performed using the disparity map 520. That is, object detection and object verification for first to fourth lanes 538a, 538b, 538c, and 538d, a construction zone 532, a first preceding vehicle 534, and a second preceding vehicle 536 in an image 530 may be performed. Meanwhile, images may be continuously acquired and the object tracking unit 440 may track verified objects.

Figure 6:
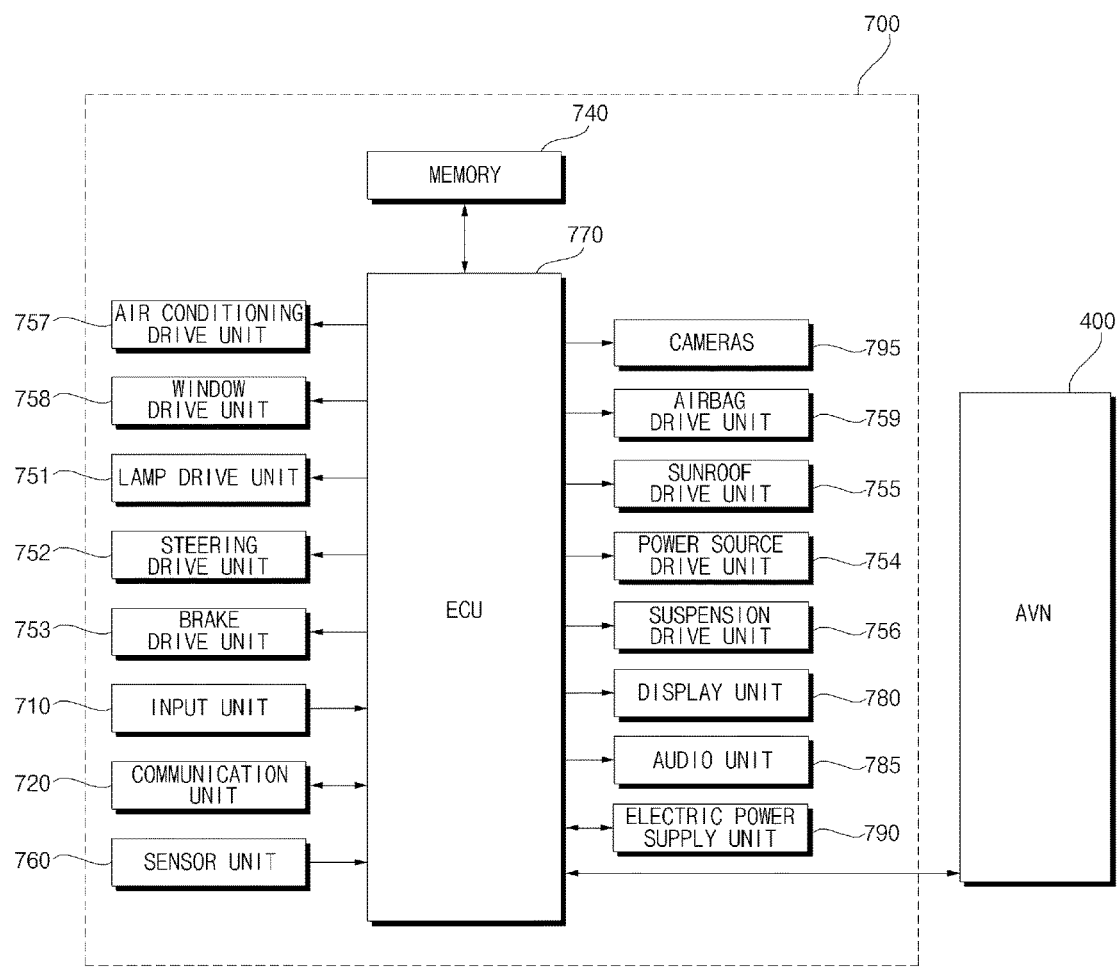
FIG. 6 is an internal block diagram showing an example of a vehicle according to an embodiment of the present disclosure.

FIG. 6 is an internal block diagram showing an example of a vehicle according to an embodiment of the present disclosure. The vehicle 200 may include an electronic control apparatus 700 for vehicle control. The electronic control apparatus 700 may exchange data with the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, an ECU 770, a display unit 780, an audio unit 785, an electric power supply unit 790, and a plurality of cameras 795.

Meanwhile, the ECU 770 may include a processor. Alternatively, an additional processor to signal-process images from the cameras may be provided in addition to the ECU 770. The input unit 710 may include a plurality of buttons or a touchscreen provided in the vehicle 200. Various input operations may be performed through the buttons or the touchscreen.

The communication unit 720 may exchange data with the mobile terminal 600 or the server 500 in a wireless fashion. In particular, the communication unit 720 may exchange data with a mobile terminal of the driver in a wireless fashion. To this end, various wireless data communication protocols, such as Bluetooth, Wi-Fi, Wi-Fi Direct, and APiX, may be used.

In one example, the communication unit 720 may receive weather information and road traffic state information, such as TPEG information, from the mobile terminal 600 or the server 500. When a user gets into the vehicle, a mobile terminal 600 of the user may pair with the electronic control apparatus 700 automatically or by the user executing an application.

The memory 740 may store various data for overall operation of the electronic control apparatus 700, such as programs for processing or control of the ECU 770.

The lamp drive unit 751 may control turn on/turn off of lamps provided inside and outside the vehicle. In addition, the lamp drive unit 751 may control intensity, direction, etc. of light emitted from each lamp. For example, the lamp drive unit 751 may control a direction indicating lamp, a brake lamp, etc.

The steering drive unit 752 may electronically control a steering apparatus in the vehicle 200. Consequently, the steering drive unit 752 may change a heading of the vehicle.

The brake drive unit 753 may electronically control a brake apparatus in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right.

The power source drive unit 754 may electronically control a power source in the vehicle 200. For example, in a case in which the power source is an engine using fossil fuel, the power source drive unit 754 may electronically control the engine. Consequently, the power source drive unit 754 may control output torque of the engine. In another example, in a case in which the power source is an electric motor, the power source drive unit 754 may control the motor. Consequently, the power source drive unit 754 may control rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle is high, the air conditioning drive unit 757 may control the air conditioner to supply cool air into the vehicle.

The window drive unit 758 may electronically control a window apparatus in the vehicle 200. For example, the window drive unit 758 may control left and right side windows of the vehicle to be opened or closed.

The airbag drive unit 759 may electronically control an airbag apparatus in the vehicle 200. For example, the airbag drive unit 759 may control an airbag to deploy in a dangerous situation.

The sensor unit 760 may sense a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, an in-vehicle humidity sensor or another appropriate type of sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, in-vehicle humidity information, and the like. In addition, the sensor unit 760 may further include an engine speed sensor, an air flow sensor (AFS), an intake air temperature sensor (ATS), a water temperature sensor (WTS), a throttle position sensor (TPS), a top dead center (TDC) sensor, and a crank angle sensor (CAS).

The ECU 770 may control overall operation of each unit in the electronic control apparatus 700. The ECU 770 may perform a specific operation based on an input through the input unit 710, receive and transmit a signal sensed by the sensor unit 760 to the around view provision apparatus 100, receive map information from the AVN apparatus 400, or control operations of the respective drive units 751, 752, 753, 754, and 756. In addition, the ECU 770 may receive weather information and road traffic state information, such as TPEG information, from the communication unit 720.

On the other hand, the ECU 770 may combine a plurality of images received from the plurality of cameras 795 to generate an around view image. In particular, when the vehicle moves forward at a predetermined speed or less or when the vehicle moves backward, the ECU 770 may generate an around view image. The display unit 780 may display the generated around view image. In particular, the display unit 180 may provide various user interfaces in addition to the around view image.

In order to display the around view image, etc., the display unit 780 may include a cluster or an HUD provided at the inside front of the vehicle. In a case in which the display unit 180 is the HUD, the display unit 180 may include a projection module to project an image on the front windshield glass of the vehicle 200. Meanwhile, the display unit 780 may include a touchscreen to allow input by tapping on the screen.

The audio unit 785 may convert an electric signal received from the ECU 770 into an audio signal and output the audio signal. To this end, the audio unit 785 may include a speaker. The audio unit 785 may output a sound corresponding to an operation of the input unit 710, e.g. a button. The audio unit 785 may also include a microphone to receive sound. Hence, the audio unit 785 may include an audio input unit and an audio output unit.

The electric power supply unit 790 may supply electric power to the respective components under control of the ECU 770. In particular, electric power from an in-vehicle battery may be supplied to the electric power supply unit 790.

The plurality of cameras 795 may be used to provide an around view image. To this end, the plurality of cameras 795 may include four cameras as shown in FIG. 2A. For example, a plurality of around view cameras 195a, 195b, 195c, and 195d may be disposed at the left side, the rear, the right side, and the front of the vehicle, respectively. A plurality of images captured by the plurality of cameras 795 may be transmitted to the ECU 770 or an additional processor.

Meanwhile, during travel of the vehicle, the driver may observe a following vehicle or a following vehicle located at the side of the vehicle through the side view mirror or the rear view mirror. However, there exists a region that cannot be observed by the naked eye of the driver or using the mirrors. Such a region is referred to as a blind spot region. As the size of the blind spot region is increased, a risk of the driver during travel of the vehicle is increased.

In order to detect the blind spot region, an embodiment of the present disclosure proposes a method of providing an around view image using around view cameras 195a, 195b, 195c, and 195d activated when the vehicle moves at a slow speed or when the vehicle moves backward.

In particular, the left side view camera 195a and the right side view camera 195c are controlled to be rotated or tilted. In addition, the rear view camera 195b may be controlled to be rotated or tilted. Rotation and tilting of the cameras will be described hereinafter in detail with reference to FIG. 7.

Figure 7:
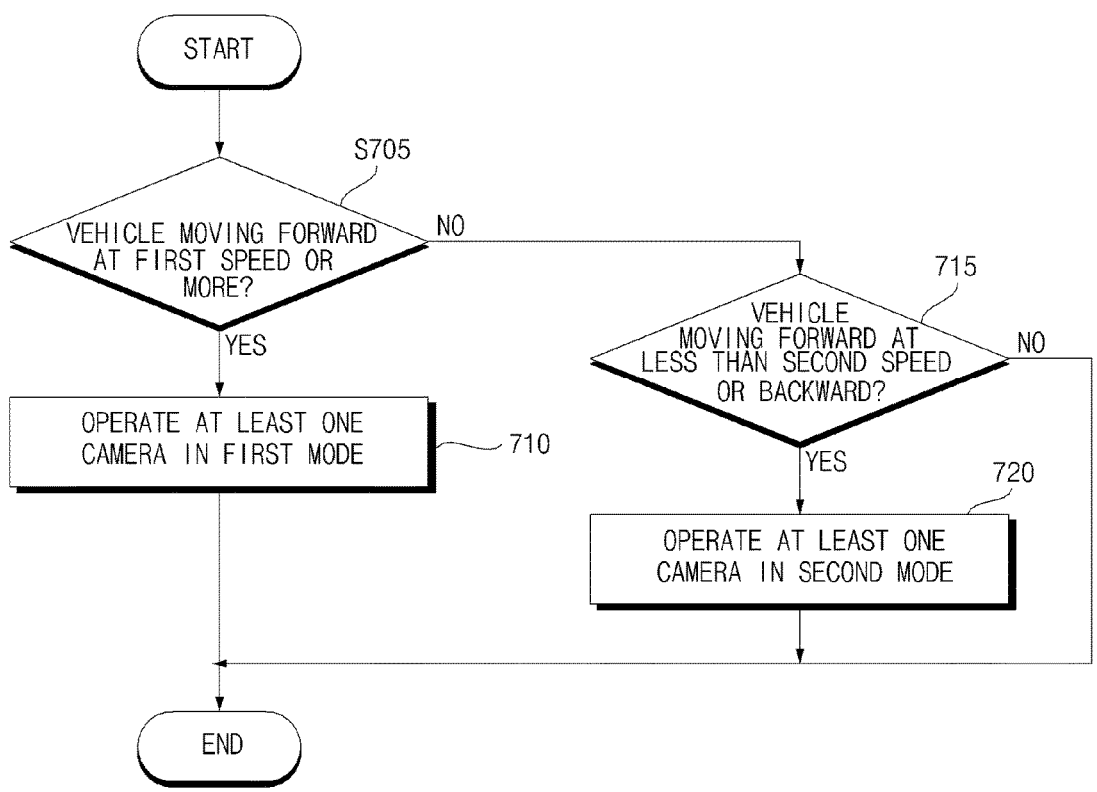
FIG. 7 is a flowchart showing an operation method of the around view provision apparatus according to the embodiment of the present disclosure.

FIG. 7 is a flowchart of an operation method of the around view provision apparatus according to an embodiment of the present disclosure and FIGS. 8A to 19 are reference views illustrating the operation method of the around view provision apparatus shown in FIG. 7.

Referring first to FIG. 7, the around view provision apparatus 100 may determine whether the vehicle is moving forward at a first speed or more, in step S705. Upon determining that the vehicle is moving forward at the first speed or more, the around view provision apparatus 100 may operate at least one of the cameras in a first mode, in Step S710.

The around view provision apparatus 100 may receive speed information and vehicle heading information sensed by the sensor unit 760 through the interface unit 130. The processor 170 of the around view provision apparatus 100 may determine whether the vehicle is moving forward at the first speed or more based on the received speed information and the received vehicle heading information. For example, the first speed may be about 50 Km/h or 30 mph.

In a case in which the vehicle is moving forward at the first speed or more, the processor 170 may control at least one of the cameras to be operated in the first mode, which may be a BSD mode, in which at least one of the cameras captures a region that cannot be observed by the side view mirror or the rear view mirror (e.g., blind spot). For example, in the first mode, the processor 170 may control cameras which are positioned to photograph a view facing the ground to be rotated or tilted such that the camera can photograph a view at the side rear of the vehicle.

The cameras operating in the first mode may include the left side view camera 195a and the right side view camera 195c, each of which may be mounted in a case surrounding a side view mirror or at a fixing unit between the side view mirror and a corresponding door of the vehicle. In addition, the cameras operating in the first mode may further include the rear view camera 195*b*.

The processor 170 may control images photographed by the cameras operating in the first mode to be displayed on the display unit 180. The image displayed on the display unit 180 in the first mode may be images containing blind spot regions photographed by the left side view camera 195*a* and/or the right side view camera 195*c*.

On the other hand, the image displayed on the display unit 180 in the first mode may be an around view image acquired by combining images photographed by the left side view camera 195*a* and the right side view camera 195*c* and images photographed by the front view camera 195*d* and the rear view camera 195*b* facing the ground. As a result, the driver may safely drive the vehicle without any blind spots.

Meanwhile, the processor 170 may detect the position of the driver based on an image from the indoor camera 195*e*, set a region that cannot be observed by the side view mirror or the rear view mirror based on the position of the driver, and operate at least one of the cameras in the first mode, e.g., the BSD mode, in which at least one of the cameras is tilted to capture the region that cannot be observed by the side view mirror or the rear view mirror.

That is, during execution of the first mode, the processor 170 may change rotational angles or tilting angles of the left side view camera 195*a* and the right side view camera 195*c* in consideration of the eye level of the user, the position of the side view mirrors in the vehicle, and the position of the rear view mirror. As a result, driver convenience and accuracy of blind spot regions may be improved.

On the other hand, upon determining at step S705 that the vehicle is not moving forward at the first speed or more, the around view provision apparatus 100 may determine whether the vehicle is moving forward at less than a second speed or is moving backward, in Step S715. Upon determining that the vehicle is moving forward at less than the second speed or is moving backward, the around view provision apparatus 100 may operate at least one of the cameras in a second mode, in Step S720.

The processor 170 of the around view provision apparatus 100 may determine whether the vehicle is moving forward at less than the second speed or is moving backward based on speed information and vehicle heading information received through the interface unit 130. For example, the second speed may be about 30 Km/h or 20 mph.

For example, in a case in which the vehicle is moving forward at less than the second speed or is moving backward, the processor 170 may determine that the driver wishes to park the vehicle and control the plural cameras 195*a*, 195*b*, 195*c*, and 195*d* to operate in the second mode, for example, an around view monitoring (AVM) mode, to assist parking of the vehicle.

The second mode, e.g., the AVM mode, may be a mode in which the plurality of cameras 195*a*, 195*b*, 195*c*, and 195*d* face the ground to photograph larger ground regions than in the first mode, e.g. the BSD mode. During execution of the second mode, the processor 170 may combine images photographed by the plurality of cameras 195*a*, 195*b*, 195*c*, and 195*d* to generate an around view image and control the generated around view image to be displayed on the display unit 180. As a result, the driver may safely drive the vehicle at a low speed or park the vehicle through the displayed around view image.

Figure 8A:
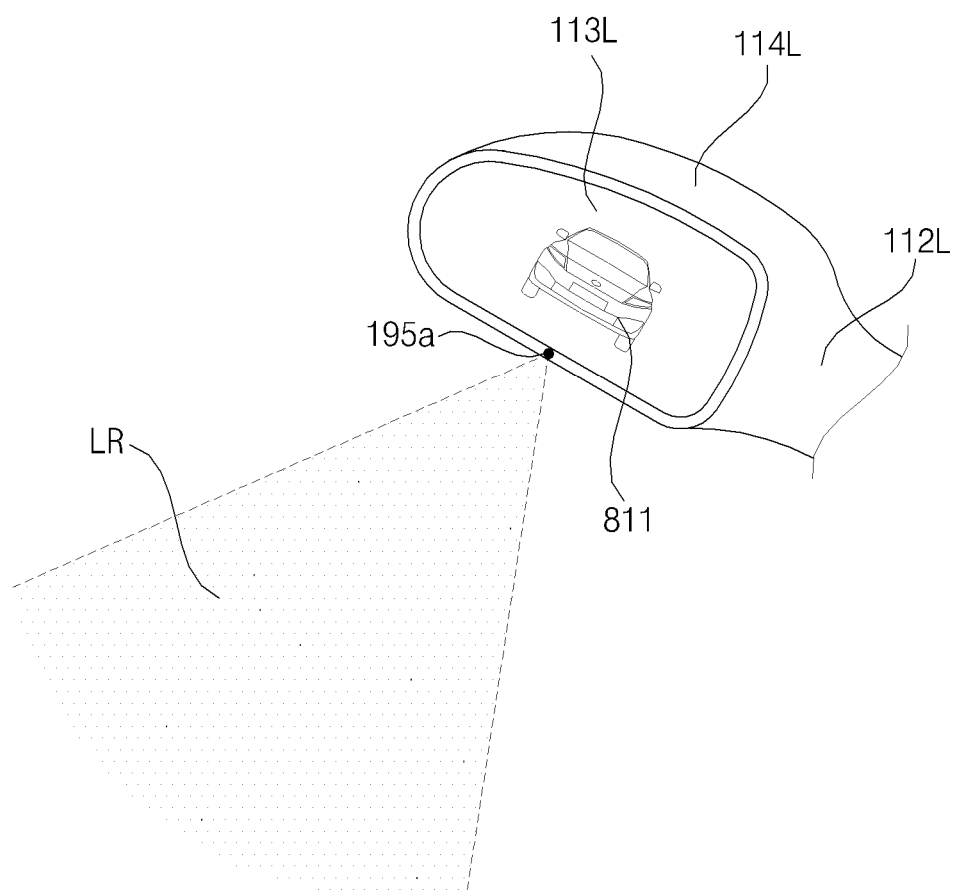
FIGS. 8A to 19 are reference views illustrating the operation method of the around view provision apparatus shown in FIG. 7.
Figure 8B:
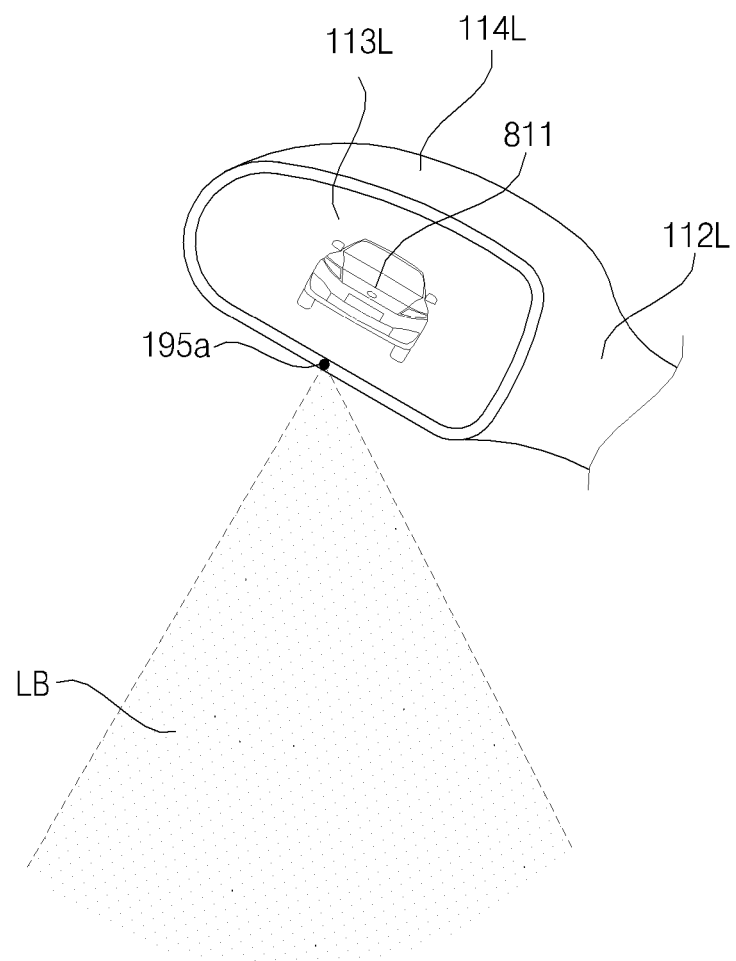
Figure 8C:
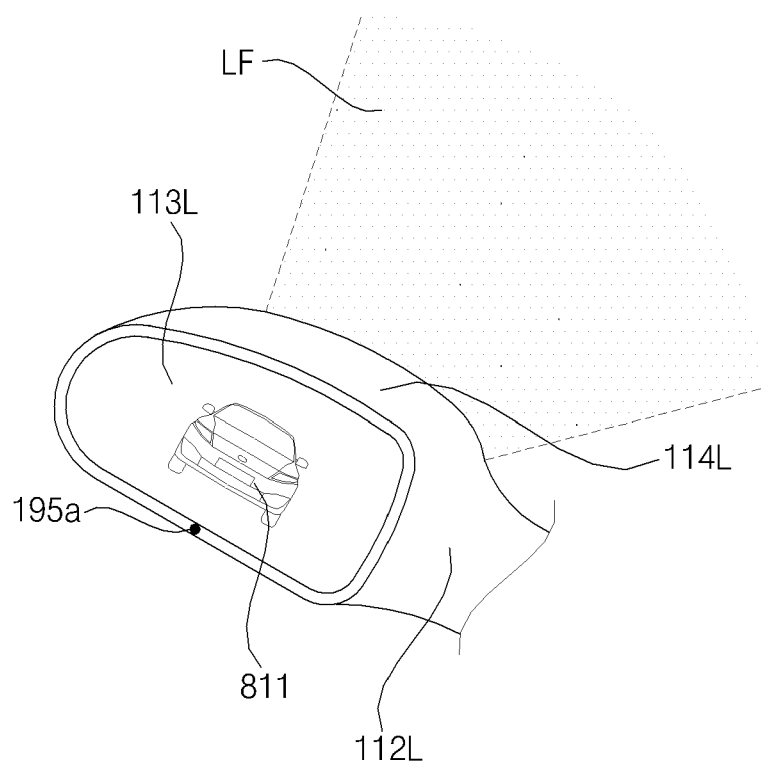

FIGS. 8A to 8C are views showing, by way of example, various tilting conditions of the left side view camera 195*a* which is mounted around a left side view mirror 113L of the vehicle. The left side view camera 195*a* may be disposed at the lower part of a case 114L surrounding the left side view mirror 113L. Alternatively, the left side view camera 195*a* may be mounted at a fixing unit 112L between the left side view mirror 113L and a left door of the vehicle.

FIG. 8A shows, by way of example, that the left side view camera 195*a* may be operated in the first mode in a case in which the vehicle is moving forward at the first speed or more. To this end, the left side view camera 195*a* may be rotated or tilted to capture an image of a side rear region LR.

FIG. 8B shows, by way of example, that the left side view camera 195*a* is operated in the second mode in a case in which the vehicle is moving forward at less than the second speed or is moving backward. To this end, the left side view camera 195*a* may be rotated or tilted to capture an image of a ground region LB.

FIG. 8C shows, by way of example, that the left side view camera 195*a* is operated in a third mode in a case in which the vehicle is moving forward at a third speed or more. To this end, the left side view camera 195*a* may be rotated or tilted to photograph an image of a front region LF. The third speed may be higher than the first and second speeds, for example, about 80 Km/h or 50 mph. When the vehicle is traveling at a high speed, the left side view camera 195*a* may photograph the front region to observe a state ahead of the vehicle.

Figure 9A:
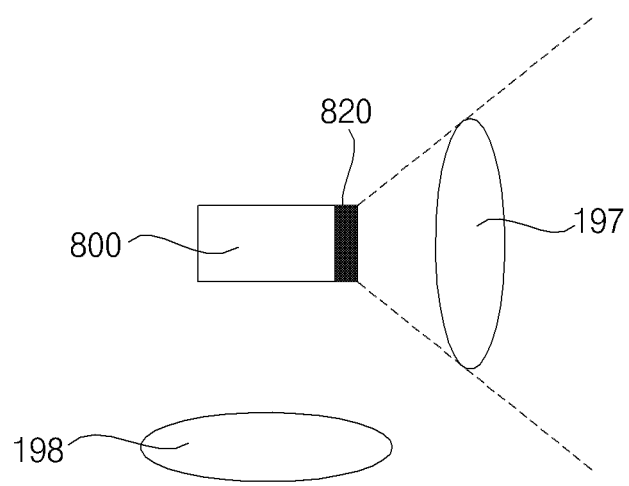
Figure 9B:
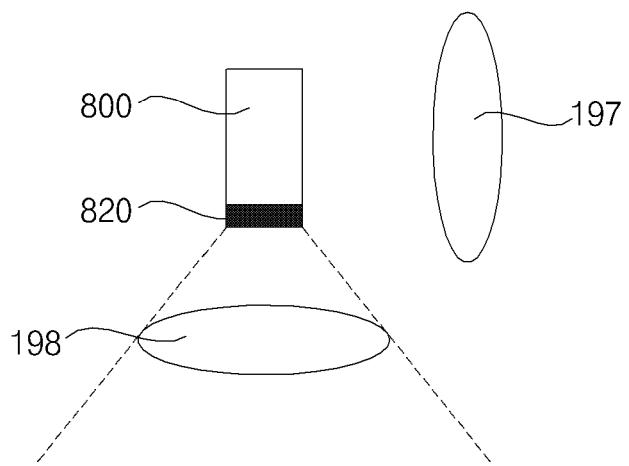

Tilting of a camera described in this specification may include tilting or rotating of a camera including a lens and an image sensor or tilting or rotating of the image sensor excluding the lens. FIGS. 9 and 10 show tilting of the image sensor without moving the lens. For example, tiling of an image sensor 820 of at least one of the plural cameras 195*a*, 195*b*, 195*c*, and 195*d*, The camera, as shown in FIGS. 9A and 9B, may include a first lens 197 for the first mode, a second lens 198 for the second mode, and a module 800 including an image sensor 820. On the other hand, the camera of FIGS. 10A to 10E may include a first lens 197 for the first mode, a second lens 198 for the second mode, and a module 810 including an image sensor 820.

FIG. 9A shows, by way of example, that the module 800 including the image sensor 820 may be tilted or rotated to the first lens 197 for operation in the first mode. Specifically, the module 800 is tilted or moved to be directed to the right. The first lens 197 may be a lens for BSD and thus may be referred to as a BSD lens.

FIG. 9B shows, by way of example, that the module 800 including the image sensor 820 is tilted to the second lens 198 for operation in the second mode. In FIG. 9B, the module 800 is tilted or rotated downward. The second lens 198 may be a lens for AVM and thus may be referred to as an AVM lens. The second lens 198 may have a wider angle than the first lens 197 since the second lens 198 is a lens for AVM, and hence, may capture a wider region.

Although the image sensor 820 of FIGS. 9A and 9B are shown as being disposed in the module 800 such that the image sensor 820 is the closest to the lens, the image sensor 820 may be disposed in the module such that the image sensor 820 is the farthest from the lens, which will hereinafter be described with reference to FIGS. 10A to 10E.

Figure 10A:
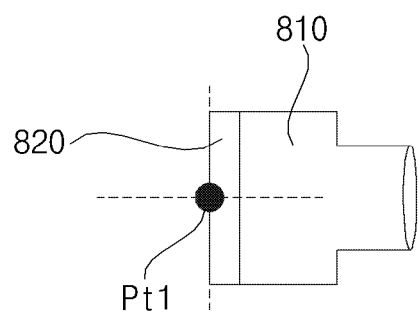

FIG. 10A shows, by way of example, a module having a structure different from that of FIGS. 9A and 9B. FIG. 10A shows, by way of example, a convex module 810 including an image sensor 820. The module 810 may be rotated or moved about a point PT1.

Figure 10B:
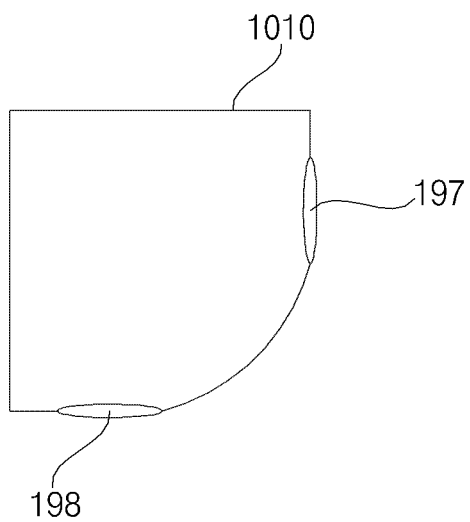

FIG. 10B shows, by way of example, a first lens 197 and a second lens 198 disposed in an arc-shaped camera case 1010. The first lens 197 may be disposed in the camera case 1010 at the right side of the camera case 1010 and the second lens 198 may be disposed in the camera case 1010 at the bottom side of the camera case 1010.

Figure 10C:
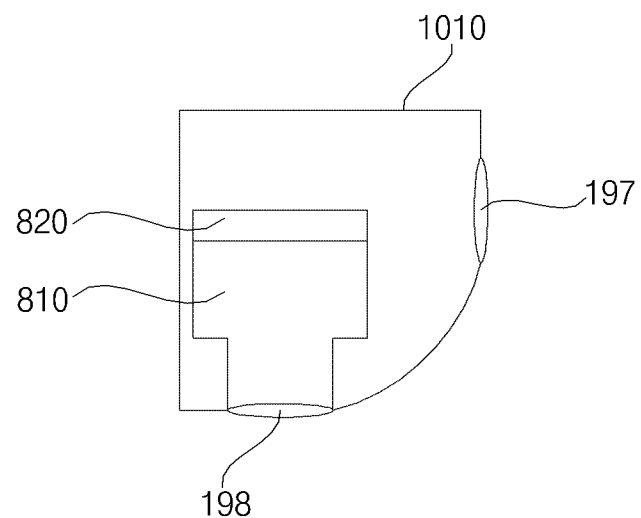
Figure 10D:
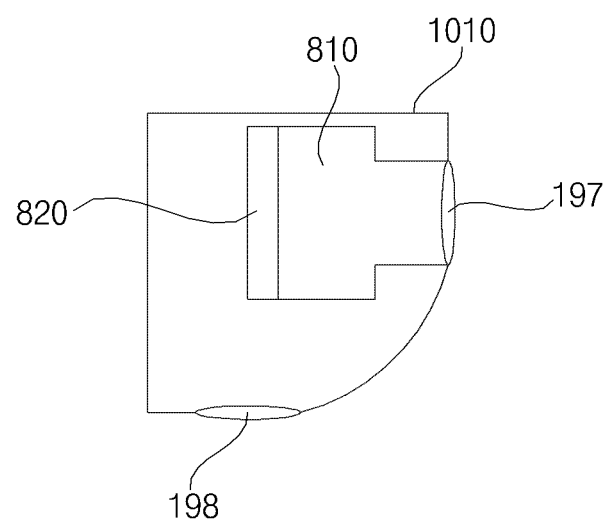
Figure 10E:
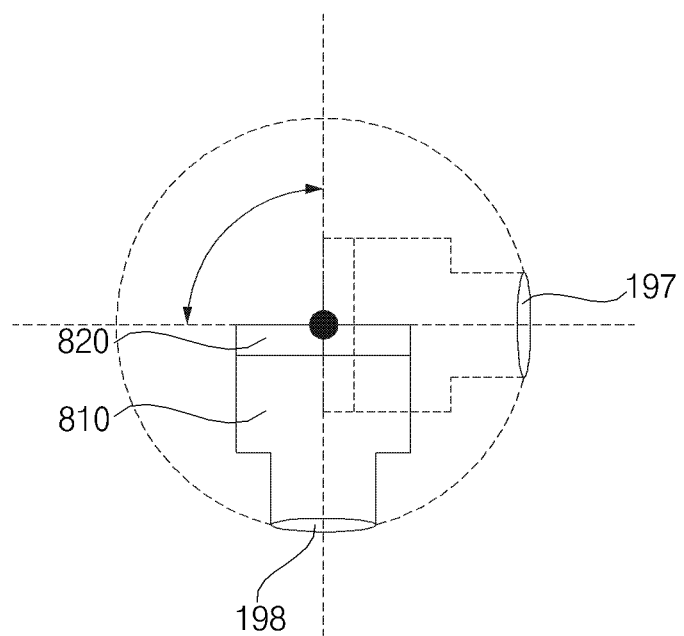

FIG. 10C shows, by way of example, a module 810 including an image sensor 820 configured to tilt or rotate to the second lens 198 for the second mode. In FIG. 10C, the module 820 is tilted or rotated downward (clockwise). FIG. 10D shows, by way of example, the module 810 including the image sensor 820 configured to tilt or rotate to the first lens 197 for the first mode. In FIG. 10D, the module 820 is tilted to the right (counter-clockwise). FIG. 10E shows, by way of example, the module 810 including the image sensor 820 being tilted between the position shown in FIG. 10C and the position shown in FIG. 10D.

Meanwhile, during execution of the first mode, e.g., the BSD mode, the processor 170 may change a region extracted from an image acquired by the camera based on the speed of the vehicle and detect an object based on the extracted image region, which will hereinafter be described with reference to FIG. 11.

Figure 11A:
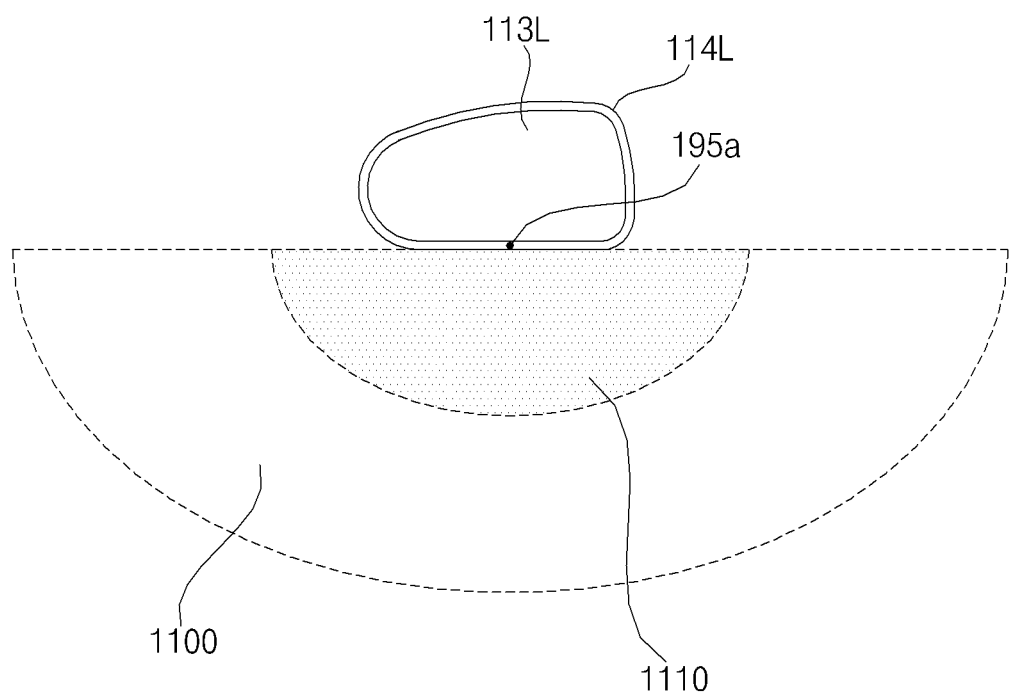
Figure 11B:
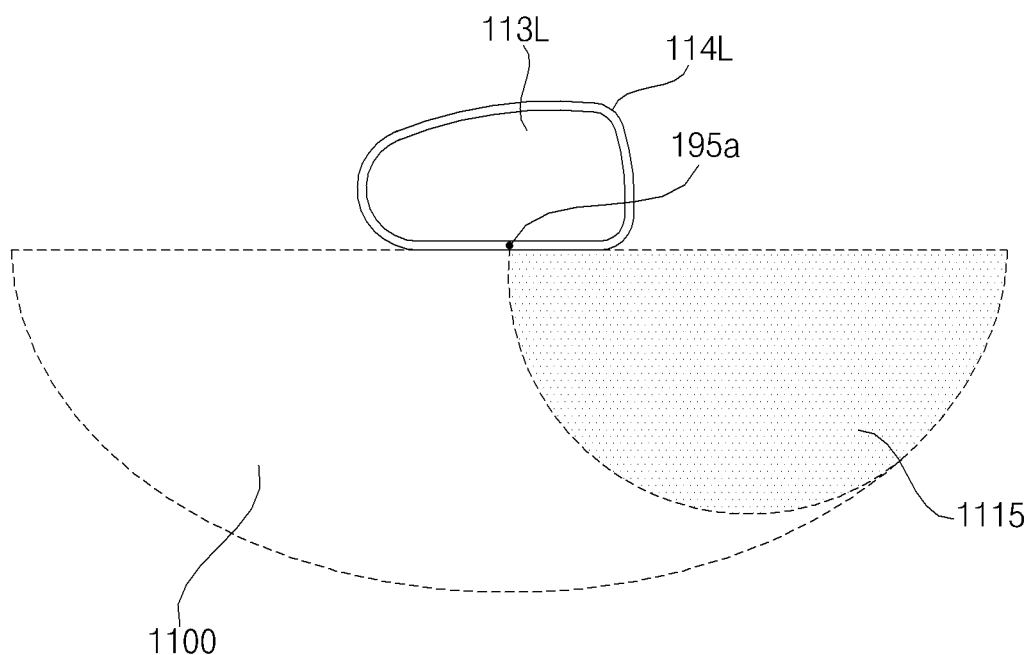

FIGS. 11A and 11B are views showing, by way of example, a photographing region 1100, corresponding to a wide angle of about 180 degrees or more, photographed by the left side view camera 195a and image processing regions 1110 and 1115 of the photographing region 1100.

FIG. 11A shows, by way of example, that the processor 170 may process a ground region 1110 of the photographing region 1100 in the second mode in a case in which the vehicle is moving forward at less than the second speed or is moving backward. As a result, an around view image for AVM may be generated. Here, the camera 195a may be moved according to the second mode to face downward. After creation of the around view image, the processor 170 may detect an object in the image.

FIG. 11B shows, by way of example, that the processor 170 may process a side rear region 1115 of the photographing region 1100 in the first mode in a case in which the vehicle is moving forward at the first speed or more. As a result, it is possible to monitor a blind spot region. Here, the camera 195a may be moved according to the first mode to face laterally, for example. The processor 170 may generate and display an image for the blind spot region and detect an object in the image.

Figure 12A:
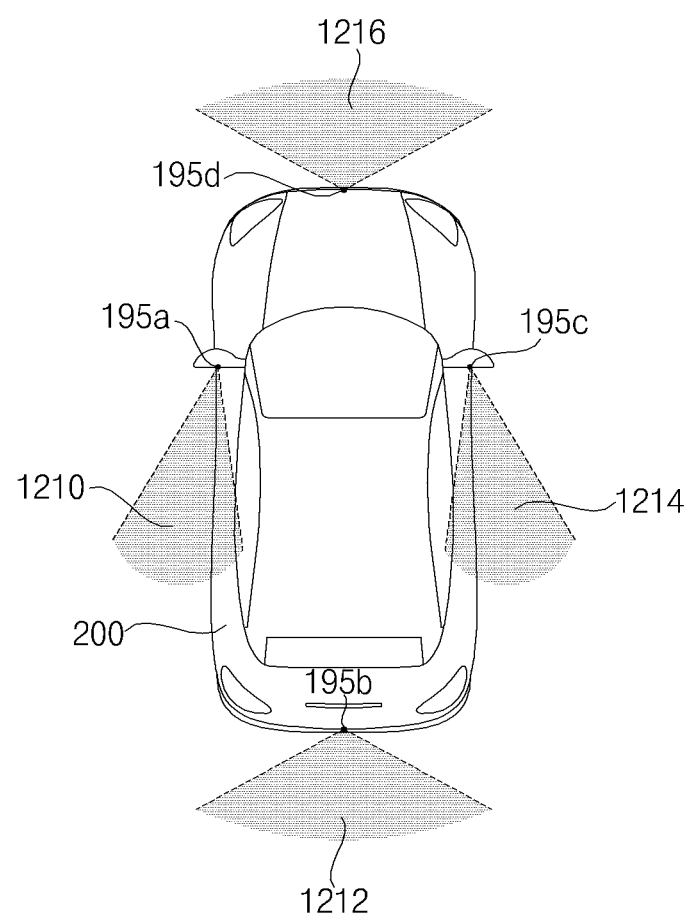
Figure 12B:
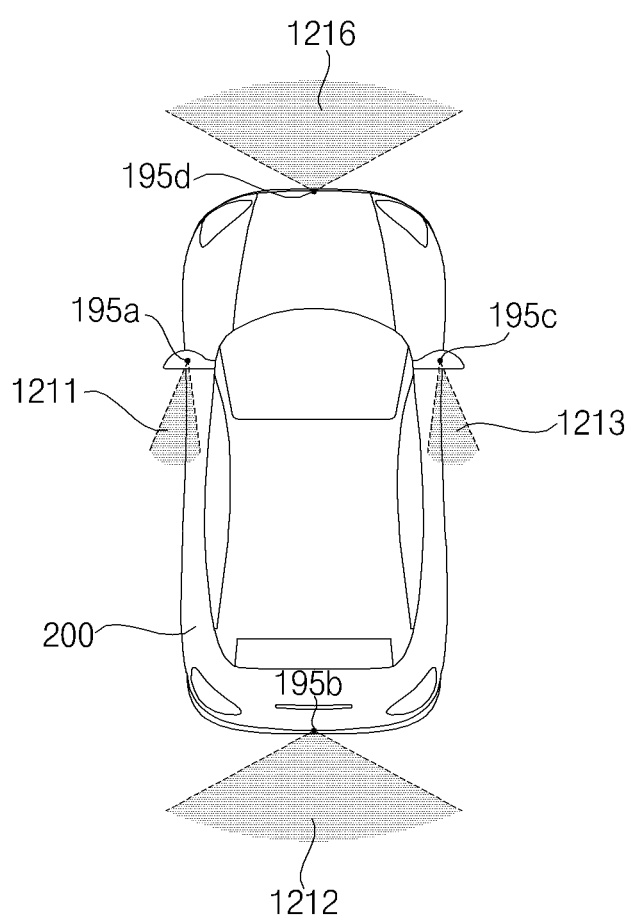

FIGS. 12A and 12B are views showing, by way of example, regions photographed by the respective cameras in the first mode and the second mode. FIG. 12A shows, by way of example, that the left side view camera 195a photographs a left side rear region 1210, the rear view camera 195b photographs a rear region 1212, the right side view camera 195c photographs a right side rear region 1214, and the front view camera 195d photographs a front region 1216 in the first mode In the first mode, the processor 170 may control an image containing at least the left side rear region 1210 and the right side rear region 1214 of the photographed regions to be generated and displayed on the display unit 180.

FIG. 12B shows, by way of example, that the left side view camera 195a photographs a left ground region 1211, the rear view camera 195b photographs a rear region 1212, the right side view camera 195c photographs a right ground region 1213, and the front view camera 195d photographs a front region 1216 in the second mode. In the second mode, the processor 170 may combine the photographed regions 1211, 1212, 1213, and 1216 to generate an around view image and control the generated around view image to be displayed on the display unit 180.

Meanwhile, when a lane change motion of another vehicle that is following the vehicle is sensed based on the image from the rear view camera 195b, the processor 170 may tilt the left side view camera 195a and the right side view camera 195c such that the first mode, e.g., the BSD mode, is executed. When an object for the following vehicle is present in the images from the left side view camera 195a and/or the right side view camera 195c, the processor 170 may control a notification message to be output through at least one selected from between the display unit 180 and the audio interface unit 185, which will hereinafter be described with reference to FIG. 13.

Figure 13:
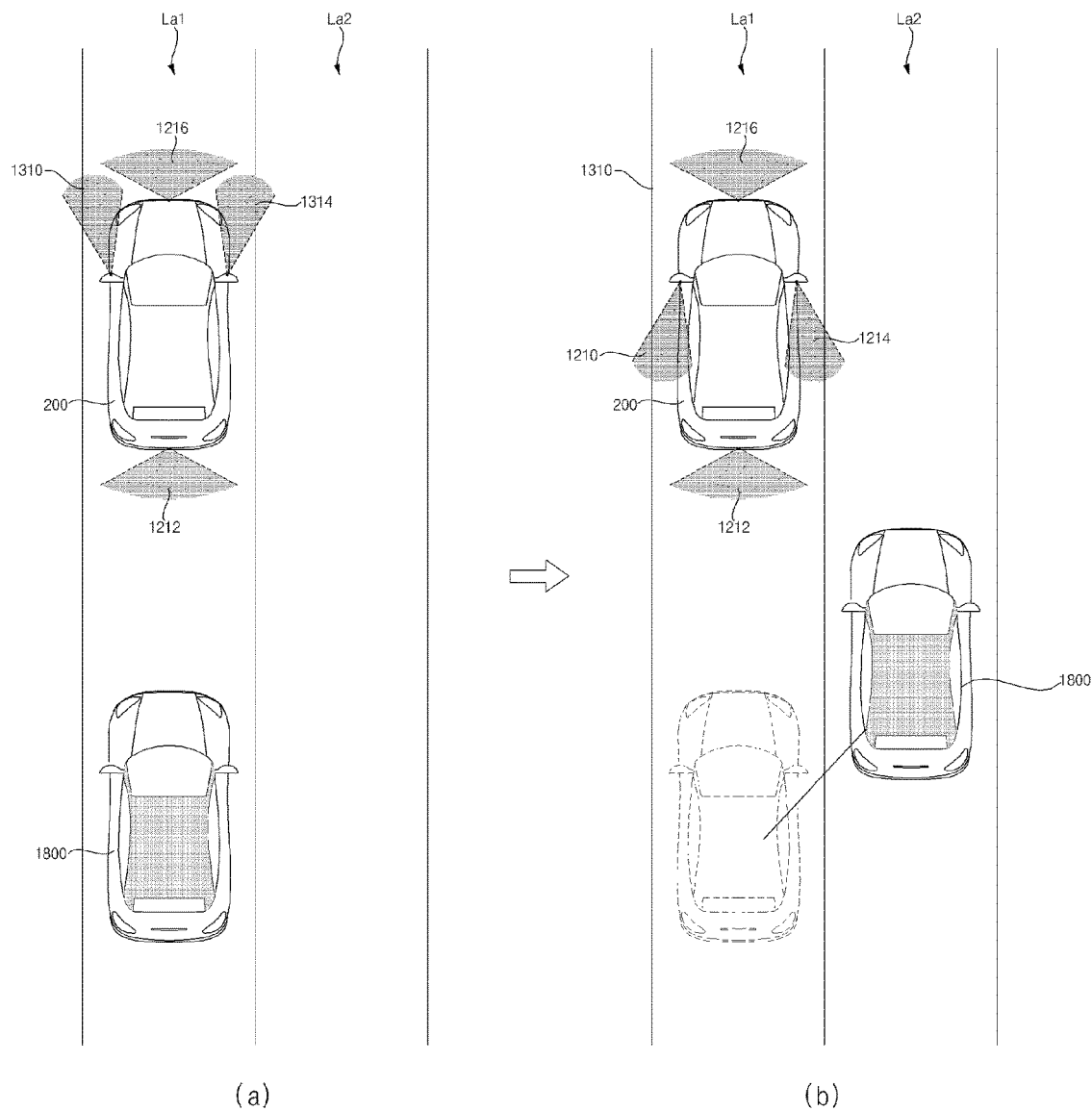

FIG. 13 shows, by way of example, that the following vehicle changes lanes to the right. FIG. 13(a) shows, by way of example, that the left side view camera 195a and the right side view camera 195c photograph a left front region 1310 and a right front region 1314, respectively. FIG. 13(a) also shows, by way of example, that the front view camera 195d photographs a front region 1216 and the rear view camera 195b photographs a rear region 1212.

In a case in which the speed of the vehicle is equal to or greater than the third speed, the processor 170 may control the left side view camera 195a and the right side view camera 195c to photograph the left front region 1310 and the right front region 1314, respectively, in the third mode as previously described with reference to FIG. 8C.

Meanwhile, the processor 170 may detect and track an object based on the image of the rear region 1212 photographed by the rear view camera 195b. As a result, the processor 170 may recognize that the following vehicle 180 is changing lanes. For example, in a case in which the lane of the following vehicle 180 is changed from left to right, e.g., from a first lane La1 to a second lane La2 as illustrated in FIG. 13(b), the processor 170 may recognize the lane change of the following vehicle 180.

In this case, the processor 170 may control the photographing regions of the left side view camera 195a and the right side view camera 195c to be changed for accurate monitoring of the following vehicle 180 that is changing lanes. That is, the processor 170 may control the left side view camera 195a and the right side view camera 195c to be rotated or tilted.

As shown in FIG. 13(b), therefore, the left side view camera 195a and the right side view camera 195c may photograph the left side rear region 1210 and the right side rear region 1214, respectively. Meanwhile, the front view camera 195d may photograph the front region 1216 and the rear view camera 195b may photograph the rear region 1212. Alternatively, the front view camera 195d may photograph the front region 1216 but the rear view camera 195b may be tilted or rotated to photograph a right side rear region. For example, the rear view camera 195b may be moved to follow the lane changing vehicle. As a result, user convenience may be improved.

On the other hand, when a percentage or ratio of a region occupied by the following vehicle object in the image from the rear view camera 195b is equal to or less than a predetermined value or when a size of the following vehicle object in the image is equal to or less than a predetermined value, the processor 170 may determine that the following vehicle has changed lanes, which will hereinafter be described with reference to FIG. 14.

Figure 14:
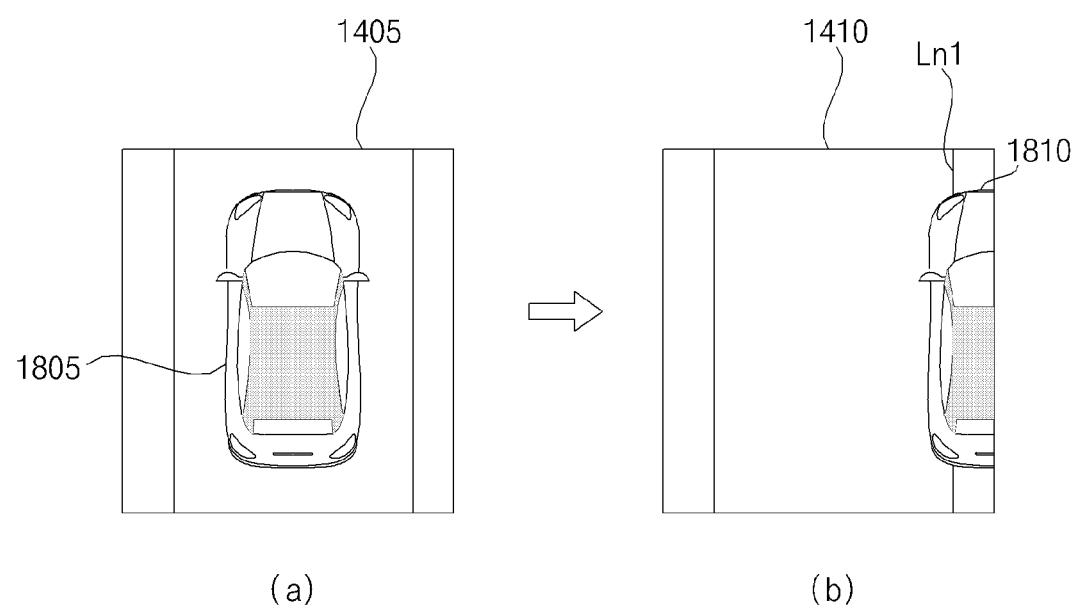

FIG. 14 shows, by way of example, an image photographed by the rear view camera 195b. In a case in which the following vehicle 1800 is moving in the same lane as the vehicle 200 as shown in FIG. 13(a), a following vehicle object 1805 is located in a middle region of an image 1405 as shown in FIG. 14(a).

On the other hand, in a case in which the following vehicle 1800 is moving in the lane to be disposed at the right side of the lane of the vehicle 200 as shown in FIG. 13(b), a following vehicle object 1810 is located in a right side region of an image 1410 as shown in FIG. 14(b). In FIG. 14(b), the following vehicle object 1810 is located on a lane-dividing line Ln1.

The processor 170 may determine whether the following vehicle has changed lanes based on the image photographed by the rear view camera 195b as shown in FIG. 14. Particularly, in a case in which a region percentage of the following vehicle object in the image 1410 is equal to or less than a predetermined value or in a case in which the size of the following vehicle object 1810 in the image is equal to or less than a predetermined value, the processor 170 may determine that the following vehicle has changed lanes. For example, the size of the following vehicle object 1810 in the image 1410 may be equal to or less than the predetermined value when the following vehicle moves outside the range of the rear view camera 195b such that only a portion of the following vehicle is captured, making the size of the image object 1810 smaller.

On the other hand, during execution of the second mode, e.g., the AVM mode, the processor 170 may combine the images from the front view camera 195d, the rear view camera 195b, the left side view camera 195a, and the right side view camera 195c to generate an around view image and control the generated around view image to be displayed on the display unit 180, which will hereinafter be described with reference to FIG. 15.

Figure 15:
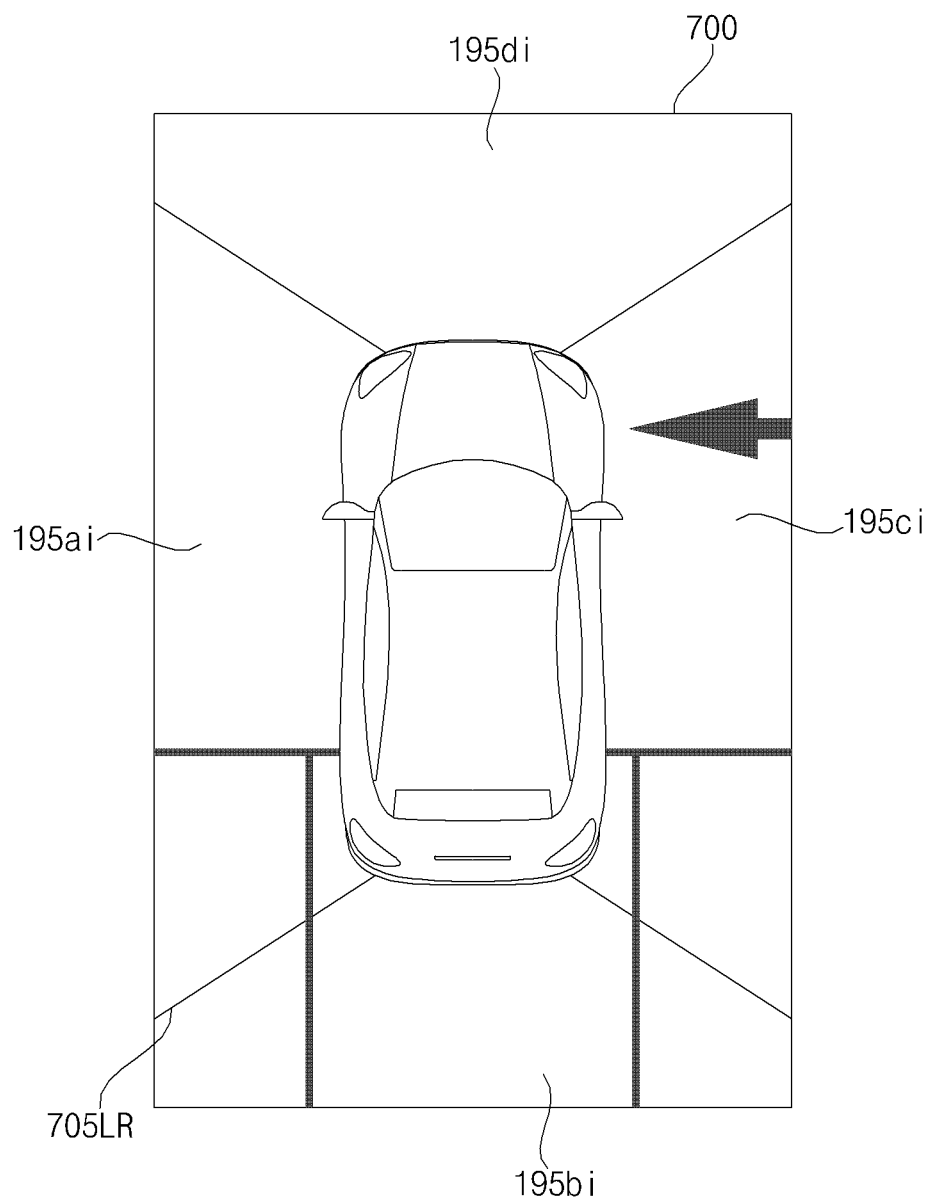

FIG. 15 shows an example of an around view image 700. In the second mode, the processor 170 may receive a plurality of images photographed by the around view cameras 195a, 195b, 195c, and 195d, combine the images to generate an around view image, and control the around view image to be displayed on the display unit 180.

The around view image 700 may include a first image region 195ai from the left side view camera 195a, a second image region 195bi from the rear view camera 195b, a third image region 195ci from the right side view camera 195c, and a fourth image region 195di from the front view camera 195d. At this time, the around view image 700 may contain an object indicating the vehicle.

Meanwhile, the processor 170 may detect an object in the around view image and, in a case in which the distance from the vehicle to the detected object is equal to or less than a predetermined value, the processor 170 may generate a notification message, a braking signal to brake the vehicle, or a steering change signal to change steering of the vehicle, which will hereinafter be described with reference to FIG. 16.

Figure 16:
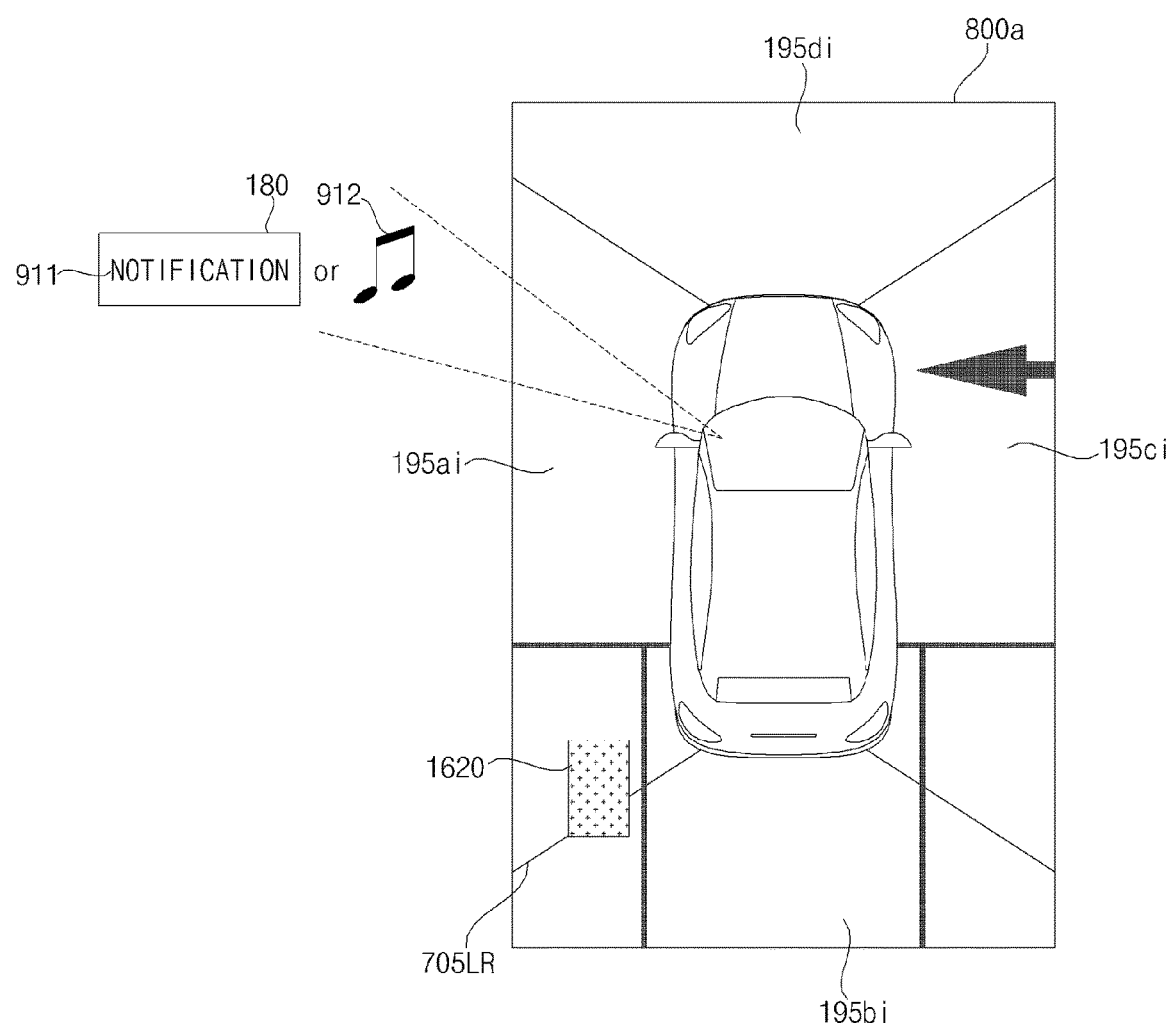

FIG. 16 shows another example of an around view image 800a. In the second mode, the processor 170 may generate an around view image as previously described. In addition, the processor 170 may detect, verify, and track an object in the around view image and, in addition, detect the distance to the object.

In a case in which an obstacle, such as a post, is located at the left rear of the vehicle as shown in FIG. 16, the processor 170 may detect an obstacle object 1620 in the around view image 800a. In a case in which the distance to the detected object is equal to or less than a predetermined value, the processor 170 may generate a notification message, a braking signal to brake the vehicle, a steering change signal to change steering of the vehicle or another appropriate signal. For example, a video, image or text notification message 911 may be displayed on the display unit 180 or an audio notification message 912 may be output through the audio interface unit 185 as illustrated in FIG. 16.

Meanwhile, in a case in which an adjacent object approaches within a predetermined distance from the vehicle, the processor 170 may control at least one of the cameras to be operated in the first mode, e.g. the BSD mode, based on sensor signals from ultrasonic sensors, which will hereinafter be described with reference to FIG. 17.

Figure 17:
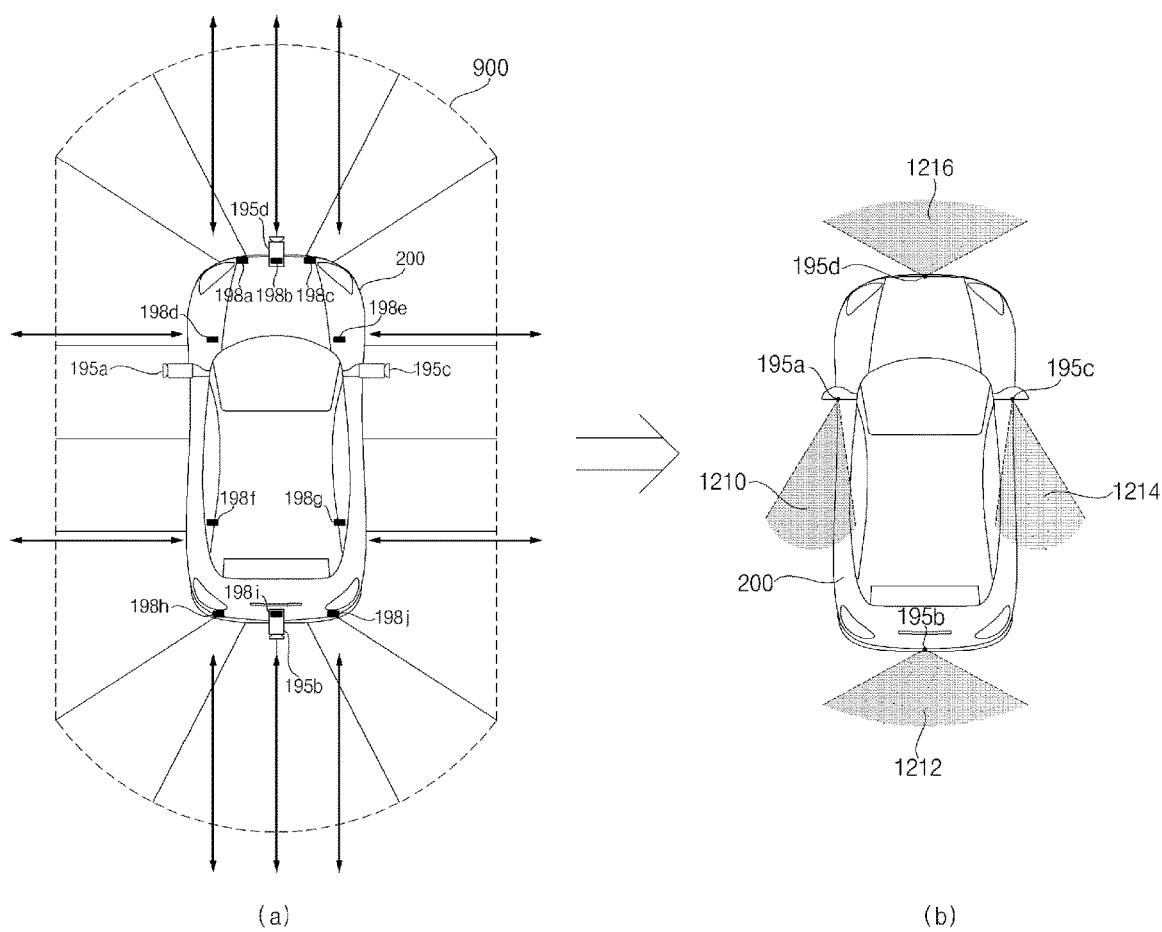

FIG. 17 shows, by way of example, that at least one of the cameras is operated in the first mode using ultrasonic sensors in the vehicle. Referring to FIG. 17(a), the vehicle 200 may include a plurality of ultrasonic sensors 198a to 198j to sense whether a specific object approaches within an around view image displayable region 900.

The first to third ultrasonic sensors 198a, 198b, and 198c may be attached to the front end of the vehicle, the fourth and fifth ultrasonic sensors 198d and 198e may be attached to opposite sides of the front part of the vehicle, the sixth and seventh ultrasonic sensors 198f and 198g may be attached to opposite sides of the rear part of the vehicle, and the eighth to tenth ultrasonic sensors 198h, 198i, and 198j may be attached to the rear end of the vehicle. Upon determining that an object is located within a predetermined distance through the ultrasonic sensors 198a to 198j, the processor may control at least one of the cameras 195a, 195b, 195c, and 195d to be operated in the first mode to detect a blind spot.

Referring to FIG. 17(b), the first mode may be executed based on operation of the ultrasonic sensors. The left side view camera 195a may photograph a left side rear region 1210, the rear view camera 195b may photograph a rear region 1212, the right side view camera 195c may photograph a right side rear region 1214, and the front view camera 195d may photograph a front region 1216. Consequently, the first mode may be executed based on operation of the ultrasonic sensors in addition to the speed of the vehicle, thereby improving user convenience.

Meanwhile, in a case in which heading of the vehicle is changed or a lane change signal is generated while the vehicle is moving forward at the first speed or more, the processor 170 may control cameras corresponding to the heading of the vehicle or a direction based on the lane change signal to be operated in the first mode, e.g., the BSD mode. The processor 170 may control the camera to be rotated or tilted to a corresponding direction. This will hereinafter be described with reference to FIG. 18.

Figure 18:
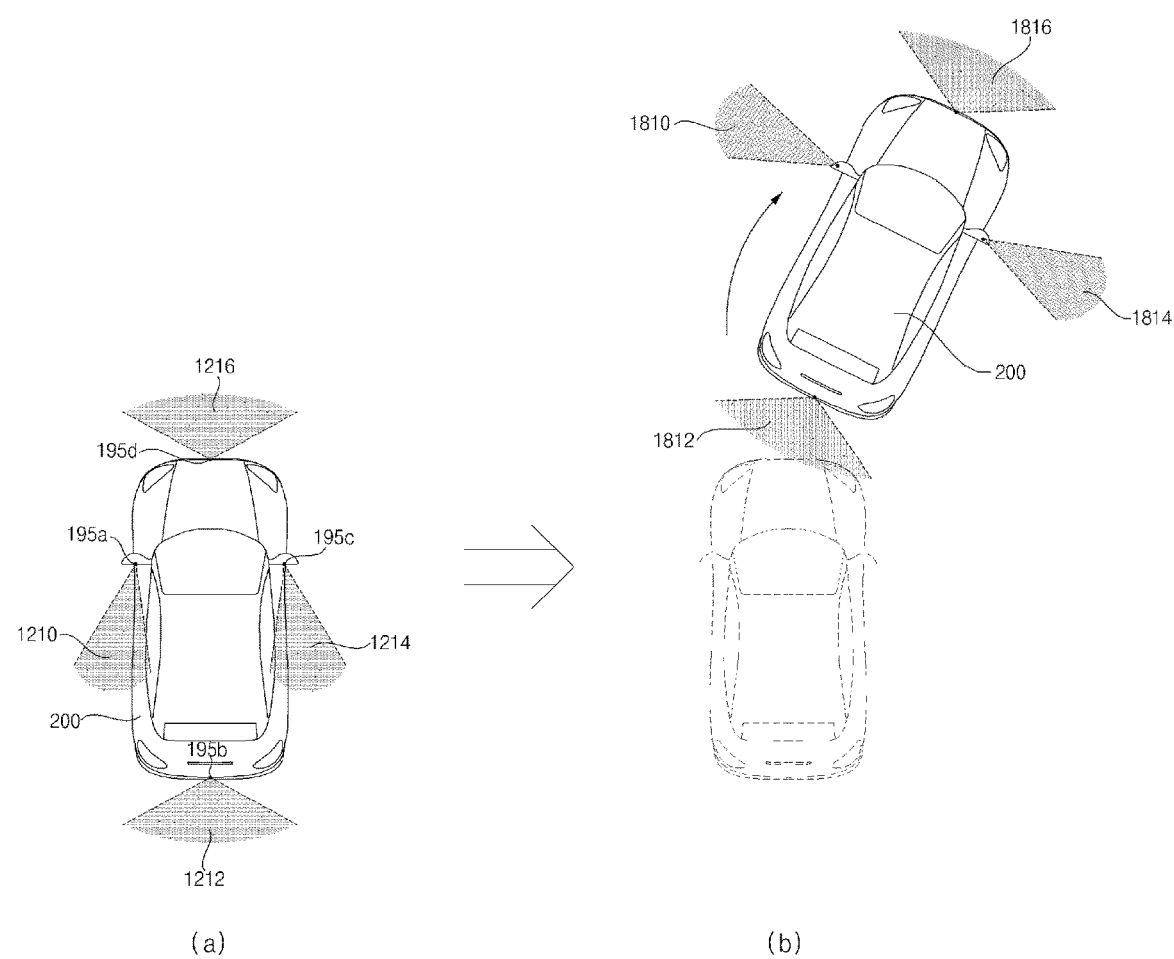

FIG. 18 shows, by way of example, that the photographing regions of the cameras are changed when the vehicle moves to the right during operation of the cameras in the first mode. Referring to FIG. 18(a), the left side view camera 195a may photograph a left side rear region 1210, the rear view camera 195b may photograph a rear region 1212, the right side view camera 195c may photograph a right side rear region 1214, and the front view camera 195d may photograph a front region 1216 in the first mode.

When the vehicle moves to the right, the processor 170 may control the left side view camera 195a and the right side view camera 195c to photograph a left side rear region 1810 and a right side rear region 1814, respectively, in response to the movement of the vehicle to the right. The front view camera 195d and the rear view camera 195b may photograph a front region 1816 and a rear region 1812, respectively, without being tilted. As a result, the driver may acquire information regarding movement direction of the vehicle.

Meanwhile, the memory 140 may store an image photographed by at least one of the cameras in the first mode, e.g., the BSD mode, or an image photographed by at least one of the cameras in the second mode, e.g., the AVM mode. Meanwhile, in a case in which the travel direction of the vehicle is changed, in a case in which a travel direction manipulation signal is generated, in a case in which the distance between the vehicle and an adjacent object is equal to or less than a predetermined value, or in a case in which a difference in speed between the vehicle and an adjacent vehicle is equal to or greater than a predetermined value, the processor 170 may control the image photographed in the first mode, e.g., the BSD mode, or in the second mode, e.g., the AVM mode, to be stored in the memory, which will hereinafter be described with reference to FIG. 19.

Figure 19:
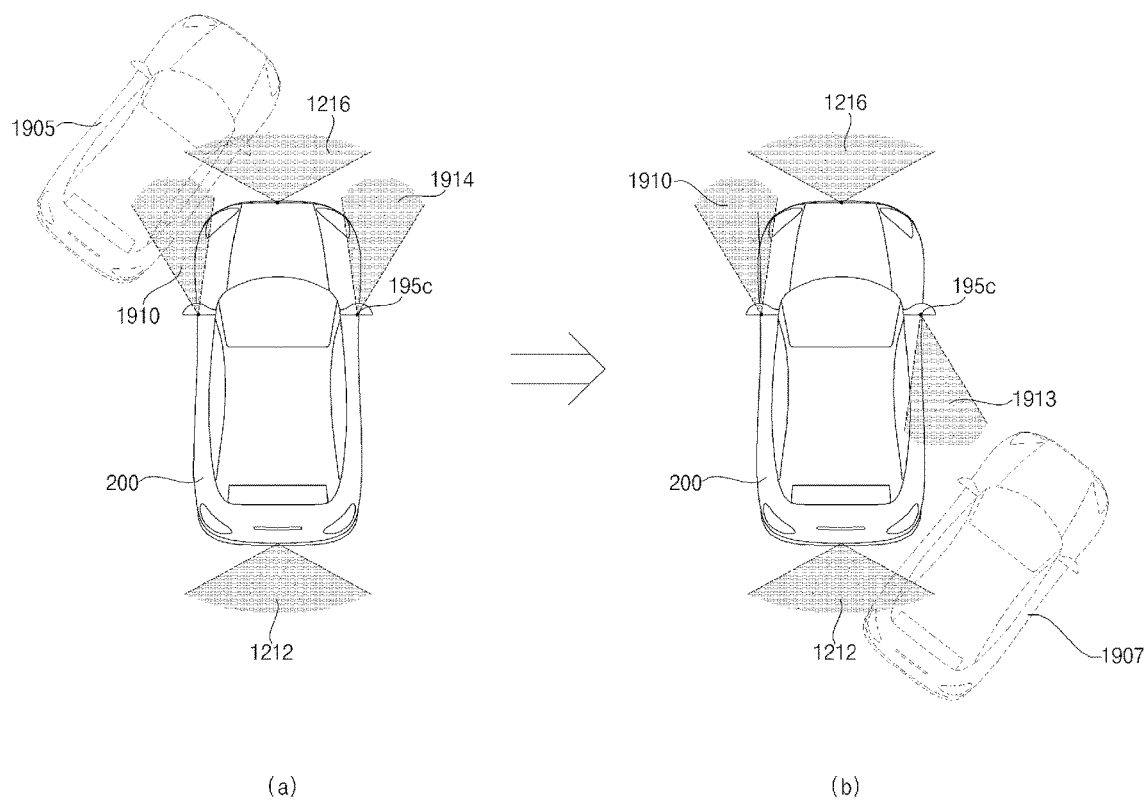

FIG. 19(*a*) shows, by way of example, a case in which a distance between the vehicle 200 and a preceding vehicle 1905 is within a predetermined distance due to, for example, lane change of the preceding vehicle 1905. In this case, the processor 170 may perform object detection and distance detection for the preceding vehicle 1905 based on an image photographed by the front view camera 195*d*. When the detected distance is equal to or greater than a predetermined value, the processor 170 may control a photographing region of at least one of the cameras 195*a*, 195*b*, 195*c*, and 195*d* to be changed.

For example, in a case in which the distance between the vehicle 300 and the preceding vehicle 1905 is within a predetermined distance due to lane change of the preceding vehicle 1905 as shown in FIG. 19(*a*) during operation of the cameras 195*a*, 195*b*, 195*c*, and 195*d* in the first mode as shown in FIG. 12A, the processor 170 may control the left side view camera 195*a* and the right side view camera 195*c* to be tilted to photograph a left side front region 1910 and a right side front region 1914, respectively.

In addition, in a case in which the distance between the vehicle 200 and the preceding vehicle 1905 is within the predetermined distance due to lane change of the preceding vehicle 1905, the processor 170 may control the photographed images to be stored in the memory 140. As a result, it is possible for the driver to easily and conveniently acquire an image during an accident or immediately before the accident.

On the other hand, FIG. 19(*b*) shows, by way of example, a case in which a distance between the vehicle 200 and a following vehicle 1907 is within a predetermined distance due to lane change of the following vehicle 1907. Here, the processor 170 may control the right side view camera 195*c* to be tilted to photograph a right side rear region 1913.

In addition, when the distance between the vehicle 200 and the following vehicle 1907 is within the predetermined distance due to lane change of the following vehicle 1907, the processor 170 may control the photographed image to be stored in the memory 140. As a result, it is possible for the driver to easily and conveniently acquire an image during an accident or immediately before the accident.

The method of operating the around view provision apparatus and the vehicle according to the present disclosure may be implemented as code that can be written on a processor-readable recording medium and thus read by a processor provided in the around view provision apparatus or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As is apparent from the above description, an around view provision apparatus and a vehicle including the same as broadly described and embodied herein may each include at least one direction-adjustable camera mounted at the vehicle and a processor to control the at least one camera to be operated in a first mode, in which the at least one camera photographs a region that cannot be observed by a side view mirror or a rear view mirror, in a case in which the vehicle is moving forward at a first speed or more and to control the at least one camera to be operated in a second mode, in which the at least one camera photographs a larger ground region than in the first mode, in a case in which the vehicle is moving forward at less than a second speed or is moving backward. Consequently, it is possible to photograph a region that cannot be observed by the naked eye or provide an around view image.

On the other hand, the processor may detect the position of a driver based on an image from an indoor camera and change rotational angles or tilting angles of a left side view camera and a right side view camera based on the position of the driver such that the left side view camera and the right side view camera photograph the region that cannot be observed by the naked eye. As a result, driver convenience is improved.

In accordance with another aspect of the present disclosure, a vehicle may include a steering drive unit to drive a steering apparatus, a brake drive unit to drive a brake apparatus, a power source drive unit to drive a power source, at least one direction-adjustable camera mounted at the vehicle, and a processor to control the at least one camera to be operated in a first mode, in which the at least one camera photographs a region that cannot be observed by a side view mirror or a rear view mirror, in a case in which the vehicle is moving forward at a first speed or more and to control the at least one camera to be operated in a second mode, in which the at least one camera photographs a larger ground region than in the first mode, in a case in which the vehicle is moving forward at less than a second speed or is moving backward.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An around view provision apparatus comprising:
   at least one camera mounted on a vehicle, a direction of the at least one camera being adjustable; and
   a processor to control the at least one camera to capture images around the vehicle based on a movement of the vehicle,
   wherein the at least one camera is controlled to operate in a first mode when the vehicle is moving forward at a first prescribed speed or more and controlled to operate in a second mode when the vehicle is moving forward at less than a second prescribed speed or is moving backward, and
   wherein, in the first mode, the at least one camera configured to capture a lateral region that cannot be observed through a side view mirror or a rear view mirror, and in the second mode, the at least one camera configured to capture a larger region that is angled downward relative to the lateral region in the first mode; and
   an indoor camera mounted in the vehicle, wherein
   a position of a driver is detected based on an image from the indoor camera, the lateral region that cannot be observed through the side view mirror or the rear view mirror is determined based on the detected position of the driver, and the at least one camera is controlled to operate in the first mode, the at least one camera being moved in the first mode to capture the lateral region that cannot be observed through the side view mirror or the rear view mirror.

2. The around view provision apparatus according to claim 1, wherein the at least one camera includes a left side view camera and a right side view camera, each of which is mounted at a casing for a side view mirror or a fixing unit provided between the side view mirror and a door of the vehicle.

3. The around view provision apparatus according to claim 1, wherein the at least one camera includes a side view camera and a rear view camera.

4. The around view provision apparatus according to claim 3, further comprising at least one of a display unit or an audio output unit, wherein
   when a lane change motion of a second vehicle is sensed based on an image from the rear view camera, the side view camera is moved according to the first mode, and
   when an object corresponding to the second vehicle is present in an image captured by the side view camera, a notification message is output through at least one of the display unit or the audio output unit.

5. The around view provision apparatus according to claim 4, wherein, when a percentage of a region occupied by an object corresponding to the second vehicle in the image from the rear view camera is equal to or less than a predetermined value or when a size of the object is less than or equal to a predetermined value, the second vehicle is determined to be changing lanes.

6. The around view provision apparatus according to claim 1, wherein the at least one camera is controlled to be moved for operation in the first mode or the second mode.

7. The around view provision apparatus according to claim 1, wherein, during execution of the first mode, a region extracted from an image acquired by the at least one camera is changed based on a speed of the vehicle and an object is detected based on the extracted image region.

8. The around view provision apparatus according to claim 1, further comprising a display unit, wherein
   during execution of the second mode, images from a front view camera, a rear view camera, a left side view camera, and a right side view camera are combined to generate an around view image and the generated around view image is displayed on the display unit.

9. The around view provision apparatus according to claim 8, wherein an object is detected in the around view image and, when a distance from the vehicle to the detected object is less than or equal to a predetermined value, at least one of a notification message, a braking signal to brake the vehicle, or a steering change signal is generated to change steering of the vehicle.

10. The around view provision apparatus according to claim 1, further comprising at least one ultrasonic sensor mounted on the vehicle, wherein
    when an object approaches within a predetermined distance from the vehicle, the at least one camera is controlled to operate in the first mode based on a sensor signal from the at least one ultrasonic sensor.

11. The around view provision apparatus according to claim 1, wherein, when a heading of the vehicle is changed or a lane change signal is generated while the vehicle is moving forward at the first prescribed speed or more, the at least one camera is controlled corresponding to the heading of the vehicle or a direction based on the lane change signal to operate in the first mode.

12. The around view provision apparatus according to claim 1, further comprising a memory to store an image captured by the at least one camera in the first mode or an image captured by the at least one camera in the second mode.

13. The around view provision apparatus according to claim 12, wherein when a travel direction of the vehicle is changed, when a travel direction manipulation signal is generated, when a distance between the vehicle and an object adjacent to the vehicle is less than or equal to a predetermined value, or when a difference in speed between the vehicle and a second vehicle is greater than or equal to a predetermined value, the image captured in the first mode or the second mode is stored in the memory.

14. A vehicle comprising:
    a steering drive unit to drive a steering apparatus; a brake drive unit to drive a brake apparatus; a power source drive unit to drive a power source;
    at least one camera mounted on the vehicle, a direction of the at least one camera being adjustable; and
    a processor to control the at least one camera to capture images around the vehicle based on a movement of the vehicle,
    wherein the at least one camera is controlled to operate in a first mode when the vehicle is moving forward at a first prescribed speed or more and the at least one camera is controlled to operate in a second mode when the vehicle is moving forward at less than a second prescribed speed or is moving backward, and
    wherein, in the first mode, the direction of the at least one camera is controlled to capture a lateral region that cannot be observed through a side view mirror or a rear view mirror, and in the second mode, the direction of the at least one camera is changed to be angled downward to capture a larger ground region relative to the lateral region in the first mode; and an indoor camera mounted in the vehicle, wherein
a position of a driver is detected based on an image from the indoor camera, the lateral region that cannot be observed through the side view mirror or the rear view mirror is determined based on the detected position of the driver, and the at least one camera is controlled to operate in the first mode, the at least one camera being moved in the first mode to capture the lateral region that cannot be observed by the side view mirror or the rear view mirror.

15. The vehicle according to claim 14, further comprising at least one of a display unit or an audio output unit, wherein
the at least one camera includes a side view camera and a rear view camera, and wherein
when a lane change motion of a second vehicle is sensed based on an image from the rear view camera, the side view camera is moved according to the first mode, and
when an object corresponding to a second vehicle is present in an image captured by the side view camera, a notification message is output through at least one of the display unit or the audio output unit.

16. The vehicle according to claim 14, wherein, when a heading of the vehicle is changed or a lane change signal is generated while the vehicle is moving forward at the first prescribed speed or more, the at least one camera is controlled corresponding to the heading of the vehicle or a direction based on the lane change signal to operate in the first mode, and wherein, during execution of the first mode, a region extracted from an image acquired by the at least one camera is changed based on a speed of the vehicle and an object is detected based on the extracted image region.

17. The vehicle according to claim 14, further comprising a display unit, wherein
during execution of the second mode, images from a front view camera, a rear view camera, a left side view camera, and a right side view camera are combined to generate an around view image and the generated around view image is displayed on the display unit.

18. The vehicle according to claim 14, further comprising a memory to store an image captured by the at least one camera in the first mode or an image captured by the at least one camera in the second mode, wherein
when a travel direction of the vehicle is changed, when a travel direction manipulation signal is generated, when a distance between the vehicle and an object adjacent to the vehicle is less than or equal to a predetermined value, or when a difference in speed between the vehicle and a second vehicle is greater than or equal to a predetermined value, the image captured in the first mode or the second mode is stored in the memory.

* * * * *